United States Patent
Kobayashi et al.

(10) Patent No.: US 8,873,808 B2
(45) Date of Patent: Oct. 28, 2014

(54) IMAGE PROCESSING APPARATUS, IMAGE PROCESSING METHOD, AND PROGRAM

(75) Inventors: Goh Kobayashi, Tokyo (JP); Yuji Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 288 days.

(21) Appl. No.: 13/435,746

(22) Filed: Mar. 30, 2012

(65) Prior Publication Data

US 2012/0257790 A1 Oct. 11, 2012

(30) Foreign Application Priority Data

Apr. 8, 2011 (JP) ................................ 2011-086498

(51) Int. Cl.
| | | |
|---|---|---|
| G06T 7/20 | (2006.01) | |
| G06T 5/00 | (2006.01) | |
| H04N 5/357 | (2011.01) | |
| H04N 5/232 | (2006.01) | |
| H04N 5/14 | (2006.01) | |
| H04N 7/01 | (2006.01) | |
| H04N 5/217 | (2011.01) | |
| H04N 5/353 | (2011.01) | |

(52) U.S. Cl.
CPC ............. *H04N 5/145* (2013.01); *H04N 5/2329* (2013.01); *H04N 7/0127* (2013.01); *H04N 7/0137* (2013.01); *H04N 5/23206* (2013.01); *H04N 5/217* (2013.01); *H04N 5/3532* (2013.01)
USPC ........................... 382/107; 382/275; 348/241

(58) Field of Classification Search
None
See application file for complete search history.

(56) References Cited

U.S. PATENT DOCUMENTS

| | | | |
|---|---|---|---|
| 2007/0154202 A1* | 7/2007 | Lee et al. ...................... | 396/153 |
| 2009/0213231 A1* | 8/2009 | Kurokawa .................. | 348/208.1 |
| 2010/0182441 A1* | 7/2010 | Fukumoto et al. ......... | 348/208.4 |
| 2010/0214423 A1* | 8/2010 | Ogawa ....................... | 348/208.4 |
| 2012/0127330 A1* | 5/2012 | Masaoka et al. ........... | 348/208.4 |

FOREIGN PATENT DOCUMENTS

| | | |
|---|---|---|
| JP | 2006-148496 A | 6/2006 |
| WO | WO 2011013653 A1 * | 2/2011 |

* cited by examiner

*Primary Examiner* — Jon Chang
(74) *Attorney, Agent, or Firm* — Sony Corporation

(57) ABSTRACT

There is provided an image processing apparatus that includes a move detecting unit that detects a move of a subject contained in a moving image from plural frame images, based on an image signal that indicates the moving image including the frame image and delay time information that indicates a delay time of an image pickup, and a correcting unit that corrects the image signal, based on the image signal and move information that indicates a move of a detected subject.

14 Claims, 19 Drawing Sheets

IMAGE PROCESSING APPARATUS, IMAGE PROCESSING METHOD, AND PROGRAM

BACKGROUND

The present disclosure relates to an image processing apparatus, an image processing method, and a program.

In recent years, an image pickup function capable of picking up a moving image is installed on various apparatuses such as a digital still camera and a communication apparatus such as a portable telephone, for example, and an opportunity for a user to pick up a moving image is increasing. In this case, when the image pickup function is realized by a rolling shutter system, for example, that is, when an image is picked up by an image pickup element that sequentially picks up an image for each line, there is a possibility of occurrence of a distortion called a focal plane distortion in a moving image.

In this circumstance, a technique for reducing a distortion that has a possibility of occurrence in a moving image is being developed. As a technique for reducing a distortion that has a possibility of occurrence in a moving image, a technique described in Japanese Patent Application Laid-Open No. 2006-148496 is available.

SUMMARY

According to a past technique (hereinafter, also simply "past technique") for reducing a distortion that has a possibility of occurrence in a moving picture described in Japanese Patent Application Laid-Open No. 2006-148496, for example, information of two frame images that continue in time that constitute a moving image are mixed, when a focal plane distortion occurs. Therefore, when the past technique is used, there is a possibility that a focal plane distortion that occurs in a moving image can be reduced.

According to the past technique, information of two frame images are mixed by a simple linear interpolation, and an interpolation ratio is changed for each line, for example. However, according to the past technique, a linear interpolation is performed by using an image signal that corresponds to a pixel at the same position as that of the two frame images. Therefore, it is difficult to perform an interpolation with high precision based on a move of a subject contained in the moving image. Consequently, even when the past technique is used, there is a possibility of being unable to sufficiently reduce a focal plane distortion.

In the present disclosure, there are proposed an image processing apparatus, an image processing method, and a program that are new and improved, and that are able to correct a focal plane distortion.

According to the present disclosure, there is provided an image processing apparatus including a move detecting unit that detects a move of a subject contained in a moving image from a plurality of frame images, based on an image signal that indicates the moving image including the frame image and delay time information that indicates a delay time of an image pickup; and a correcting unit that corrects the image signal, based on the image signal and move information that indicates a move of a detected subject.

The above configuration achieves that a focal plane distortion can be corrected.

The image processing apparatus may further include a delay time calculating unit that calculates the delay time for each pixel, based on an image pickup parameter of an image pickup apparatus that has an image pickup element that sequentially picks up an image for each line.

The move detecting unit may specify a time phase when the moving image is picked up based on the delay time information, and detects a move of the subject for each pixel based on the specified time phase.

The he move detecting unit may adjust the specified time phase based on the delay time information.

The move detecting unit may include a reference ratio calculating unit that calculates a reference ratio that indicates a ratio for referring to each of the plurality of frame images, based on the delay time information, and a first detecting unit that detects a move of the subject based on a calculated reference ratio.

The move detecting unit may include a second detecting unit that detects a move of the subject based on the image signal, and a third detecting unit that redetects a move of the subject, based on move information that indicates a move detected by the first detecting unit, the image signal, and the delay time information.

The correcting unit may correct the image signal, based on one or more pieces of move information.

The move information may contain a reference ratio that indicates a ratio for referring to each of the plurality of frame images.

The image processing apparatus may further include a parameter acquiring unit that acquires the image pickup parameter.

The parameter acquiring unit may acquire identification information for identifying the image pickup apparatus from the image signal or from a recording medium that stores the identification information, and acquires the image pickup parameter corresponding to the acquired identification information, from a database to which the identification information and the image pickup parameter are related.

The parameter acquiring unit may acquire the image pickup parameter by estimating the image pickup parameter, based on move information detected by the move detecting unit.

The parameter acquiring unit may acquire the image pickup parameter from the image signal.

The image processing apparatus may further include an image pickup unit that picks up the moving image.

According to the present disclosure, there is also provided an image processing method including detecting a move of a subject contained in a moving image from a plurality of frame images, based on an image signal that indicates the moving image including the frame image and delay time information that indicates a delay time of an image pickup; and correcting the image signal, based on the image signal and move information that indicates a move of a detected subject.

By use of such a method, a focal plane distortion can be corrected.

According to the present disclosure, there is also provided a program that causes a computer to execute detecting a move of a subject contained in a moving image from a plurality of frame images, based on an image signal that indicates the moving image including the frame image and delay time information that indicates a delay time of an image pickup, and correcting the image signal, based on the image signal and move information that indicates a move of a detected subject.

By use of such a program, a focal plane distortion can be corrected.

According to the present disclosure, a focal plane distortion can be corrected.

DETAILED DESCRIPTION OF THE EMBODIMENT

Figure 1:
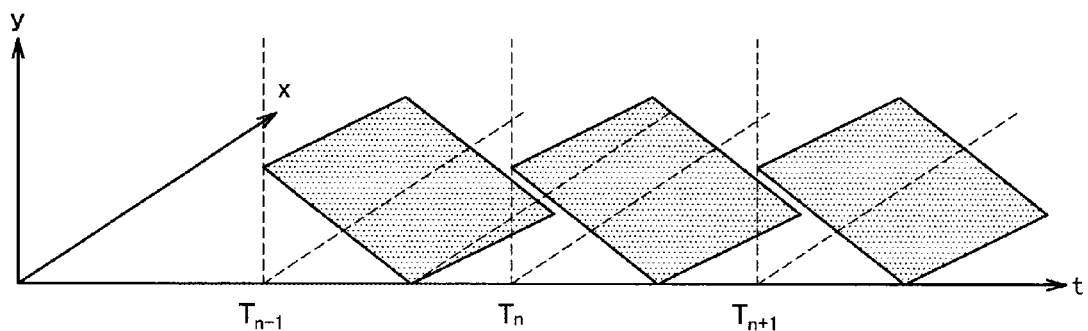
FIG. 1 is an explanatory diagram for explaining a focal plane distortion.

Hereinafter, preferred embodiments of the present disclosure will be described in detail with reference to the appended drawings. Note that, in this specification and the appended drawings, structural elements that have substantially the same function and structure are denoted by the same reference numerals, and repeated explanation of these structural elements is omitted.

Explanation is performed below in the following order.
1. An image processing method according to the present embodiment
2. An image processing apparatus according to the present embodiment
3. A program according to the present embodiment

An Image Processing Method According to the Present Embodiment

Before explaining a configuration of an image processing apparatus (hereinafter, also "image processing apparatus 100") according to the present embodiment, an outline of an image processing method according to the present embodiment is explained. The explanation is performed below by assuming that a process according to the image processing method according to the present embodiment is performed by the image processing apparatus 100.

The explanation is performed below by also assuming that the image processing apparatus 100 processes an image signal that indicates a moving image that includes frame images. In the following explanation, each frame image indicated by an image signal processed by the image processing apparatus 100 is also expressed as "input image", and an image obtained by correcting the image signal is also expressed as "corrected image".

In this case, as an image signal according to the present embodiment, there is a signal (an analog signal/a digital signal) that indicates a moving image that is obtained by a person who picks up the image by using an image pickup apparatus, for example. However, an image signal according to the present embodiment is not limited to this image. For example, the image signal according to the present embodiment can be a signal that indicates a moving image that is picked up by an image pickup apparatus installed in a vehicle or the like, or a moving image that is picked up by an image pickup apparatus installed at a fixed place such as what is called a security camera.

Further, as an image signal according to the present embodiment, there is an image signal that is obtained by the image processing apparatus 100 as a result of receiving (directly, or indirectly via a set-top box and the like) a broadcast wave transmitted from a television tower and the like decoding the received broadcast wave, for example. The image processing apparatus 100 can also process an image signal that is transmitted from an external apparatus via a network (or directly), for example. The image processing apparatus 100 can also process an image signal that is obtained by decoding image data that is stored in a recording unit (to be described later) or in an external recording medium that is detachable from the image processing apparatus 100, for example. Further, when the image processing apparatus 100 includes an image pickup unit (a device corresponding to the image pickup apparatus, to be described later) that can pick up a moving image, that is, when the image processing apparatus 100 functions as an image pickup apparatus, the image processing apparatus 100 can be arranged to process an image signal corresponding to a moving image that is picked up by the image pickup unit.

About a Focal Plane Distortion

First, a focal plane distortion that the image processing apparatus 100 according to the present embodiment corrects is explained. FIGS. 1 to 4 are explanatory diagrams for explaining the focal plane distortion.

When a CMOS (Complementary Metal Oxide Semiconductor) is used as plural image pickup elements that constitute an image sensor of an image pickup apparatus, a rolling shutter system (a line exposure sequential reading system) is employed in many cases. In this case, the rolling shutter system is a system that exposes in a raster order from an upper left of the image pickup element and transfers data, for example. When the rolling shutter system is used, the image pickup apparatus sequentially picks up an image for each line (for example, a line in a horizontal direction). Therefore, when an image is sequentially picked up for each line as performed by the rolling shutter system, for example, a frame image at a different time for each line within the same frame is taken in as shown in FIG. 1, for example.

Figure 2:
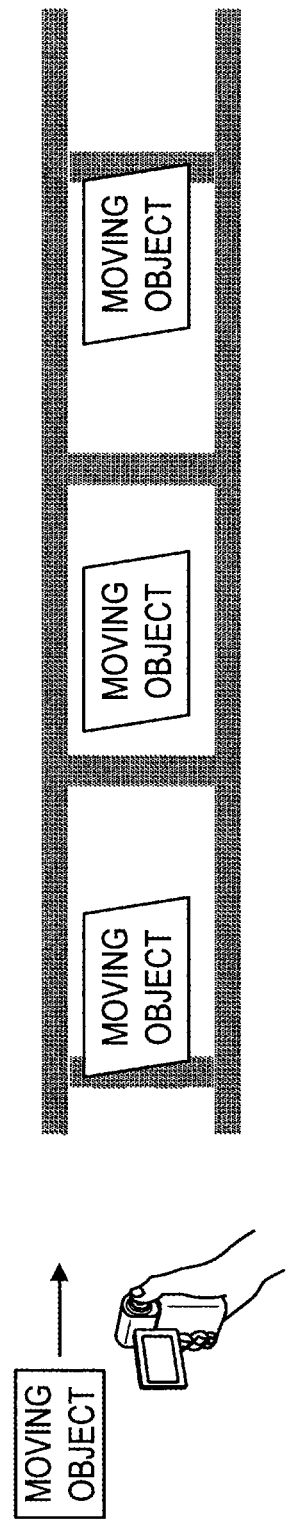
FIG. 2 is an explanatory diagram for explaining a focal plane distortion.
Figure 3:
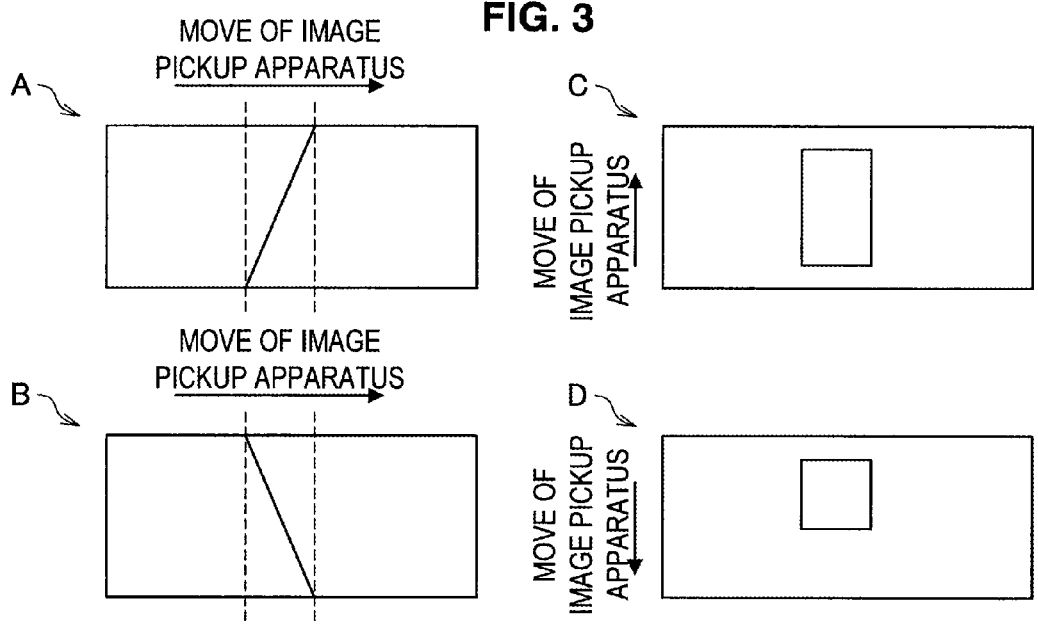
FIGS. 3A to 3D are explanatory diagrams for explaining a focal plane distortion.

Because a frame image at a different time for each line within the same frame is taken in as shown in FIG. 1, when a moving image of a rectangular object (a moving object, as an example of a subject) that moves from left to right, for example, is picked up by using an image pickup element of the CMOS, the object is expressed in a frame image as an object of a parallelogram, as shown in FIG. 2, for example. When a moving image of a rectangular object (a moving object) that moves from top to bottom, for example, is picked up by using an image pickup element of the CMOS, the object is expressed in a frame image as an object having a larger longitudinal length than that of an actual object. A distortion that occurs in an object (hereinafter, "subject") that is picked up in a moving image as described above, for example, is a "focal plane distortion" according to the present embodiment.

There is a possibility that a focal plane distortion also occurs when the image pickup apparatus moves, not only when an image picked-up object moves as described above. FIGS. 3A to 3D show examples of a focal plane distortion that has a possibility of occurrence when the image pickup apparatus moves (for example, when the image pickup apparatus pans or tilts). That is, as shown in FIG. 2 and FIGS. 3A to 3D, there is a possibility that a focal plane distortion occurs when the subject moves relatively to the image pickup element.

Figure 4:
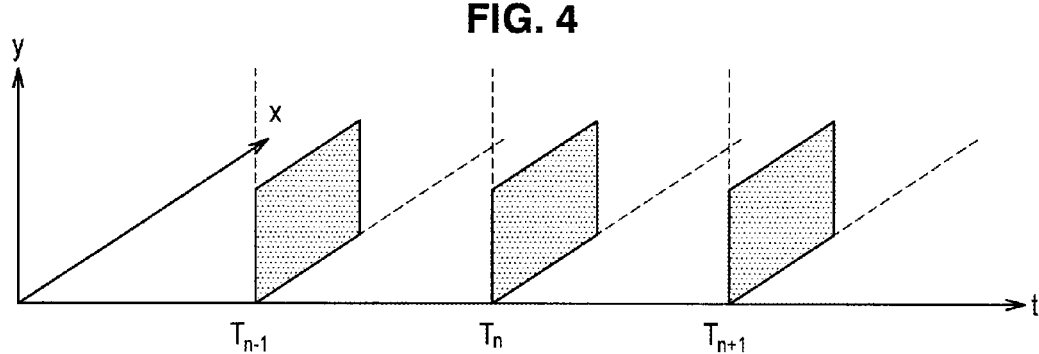
FIG. 4 is an explanatory diagram for explaining a focal plane distortion.

On the other hand, when a CCD (Charge Coupled Device) is used as plural image pickup elements that constitute an image sensor of an image pickup apparatus, a global shutter system (a simultaneous exposure batch reading system) is employed. The global shutter system is a system that simultaneously transfers data within the same frame, as shown in FIG. 4, for example. Therefore, when the global shutter system is used, a focal plane distortion does not occur.

As described above, when an image pickup function that is held by the image pickup apparatus is to be realized by an image pickup element that can realize a global shutter system like the CCD, occurrence of the focal plane distortion by itself can be prevented. However, the image pickup element of the CMOS has an advantage in that it can save energy, can read at a high speed, and is at low cost, as compared with the image pickup element of the CCD, for example. Therefore, the CMOS is used as an image pickup element in many of image pickup apparatuses of which distribution is progressed. Accordingly, to achieve a high image quality of a reproduced moving image, for example, it is desired to reduce a focal plane distortion that has a possibility of occurrence, by correcting the distortion, instead of preventing the occurrence itself of the focal plane distortion.

As a method of reducing a focal plane distortion by correction, there is a method of correcting the focal plane distortion by using move information that is detected by a sensor that the image pickup apparatus includes, for example. However, when the above method is used, it is possible to correct only a global distortion that occurs due to a camera work that indicates a move of the image pickup apparatus that picks up a moving image, for example.

Further, as described above, there is a risk of being unable to sufficiently reduce a focal plane distortion even when the past technique is used.

An Outline of the Image Processing Method According to the Present Embodiment

The image processing apparatus 100 according to the present embodiment detects a move of a subject contained in a moving image from plural frame images by taking account of a delay time of an image pickup. The image processing apparatus 100 compensates for the detected move, by correcting the image signal based on the detected move.

Because the image processing apparatus 100 takes account of the delay time of the image pickup, the image processing apparatus 100 can correct a distortion for each pixel from a local move. Because the image processing apparatus 100 corrects the image signal by taking account of the delay time of the image pickup as described above, the image processing apparatus 100 can handle both a global distortion and a local distortion. That is, because the image processing apparatus 100 corrects the image signal by taking account of the delay time of the image pickup as described above, the image processing apparatus 100 can correct a move even when the move in the moving image is a move of a camera work or a move of the object (the subject), for example. Therefore, a move of the subject contained in the moving image that is detected by the image processing apparatus 100 according to the present embodiment includes not only a move of the object (the subject) itself, but also a move of a camera work.

Therefore, the image processing apparatus 100 can correct only a focal plane distortion that has a possibility of occurrence in a moving image.

The image processing apparatus 100 specifies a delay time, by calculating a delay time of an image pickup for each pixel based on an image pickup parameter of the image pickup apparatus, and by acquiring delay time information (delay time data) that indicates a delay time of an image pickup, for example. The image pickup parameter according to the present embodiment is a value that indicates a characteristic of an image pickup of the image pickup apparatus that has an image pickup element that sequentially picks up an image for each line (for example, a line in a horizontal direction, and this is hereinafter similarly applied), for example. The image pickup parameter includes a value that indicates a delay time concerning exposure and reading of each pixel (hereinafter, also "delay time $R_{pix}$"), and a value a delay time for each line (hereinafter, also "delay time $R_{line}$"), for example.

The delay time of the image pickup according to the present embodiment is a delay time of exposure and reading for each pixel, for example. A delay time at an arbitrary position in a frame pixel (for example, a position expressed by coordinates of a pixel) is calculated by using the image pickup parameter, for example. The image processing apparatus 100 can specify a delay time at an arbitrary position in a frame image from acquired delay time information, for example. An example of a method of calculating a delay time according to the present embodiment is described later.

Figure 5:
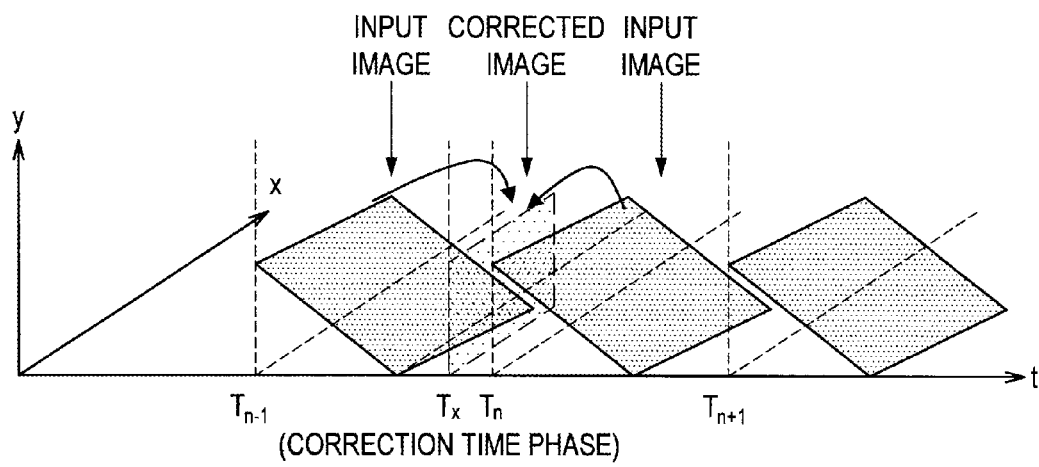
FIG. 5 is an explanatory diagram showing an outline of an image processing method according to the present embodiment.

FIG. 5 is an explanatory diagram showing an example of an outline of an image processing method according to the present embodiment. For example, as shown in FIG. 5, the image processing apparatus 100 corrects a focal plane distortion that has a possibility of occurrence, by generating a corrected image based on plural frame images (an input image).

An example of a configuration of the image processing apparatus 100 according to the present embodiment is explained below, and a detailed example of a process according to the image processing method according to the present embodiment is also explained below. An example of a configuration of the image processing apparatus 100 according to the present embodiment and a detailed example of a process according to the image processing method according to the present embodiment are explained below, by mainly taking an example that the image processing apparatus 100 calculates a delay time of the image pickup based on an image pickup parameter. In the following explanation, an image signal that is input to the image processing apparatus 100, that is, an image signal to be processed, is also expressed as "input image signal".

An Image Processing Apparatus According to the Present Embodiment

Figure 6:
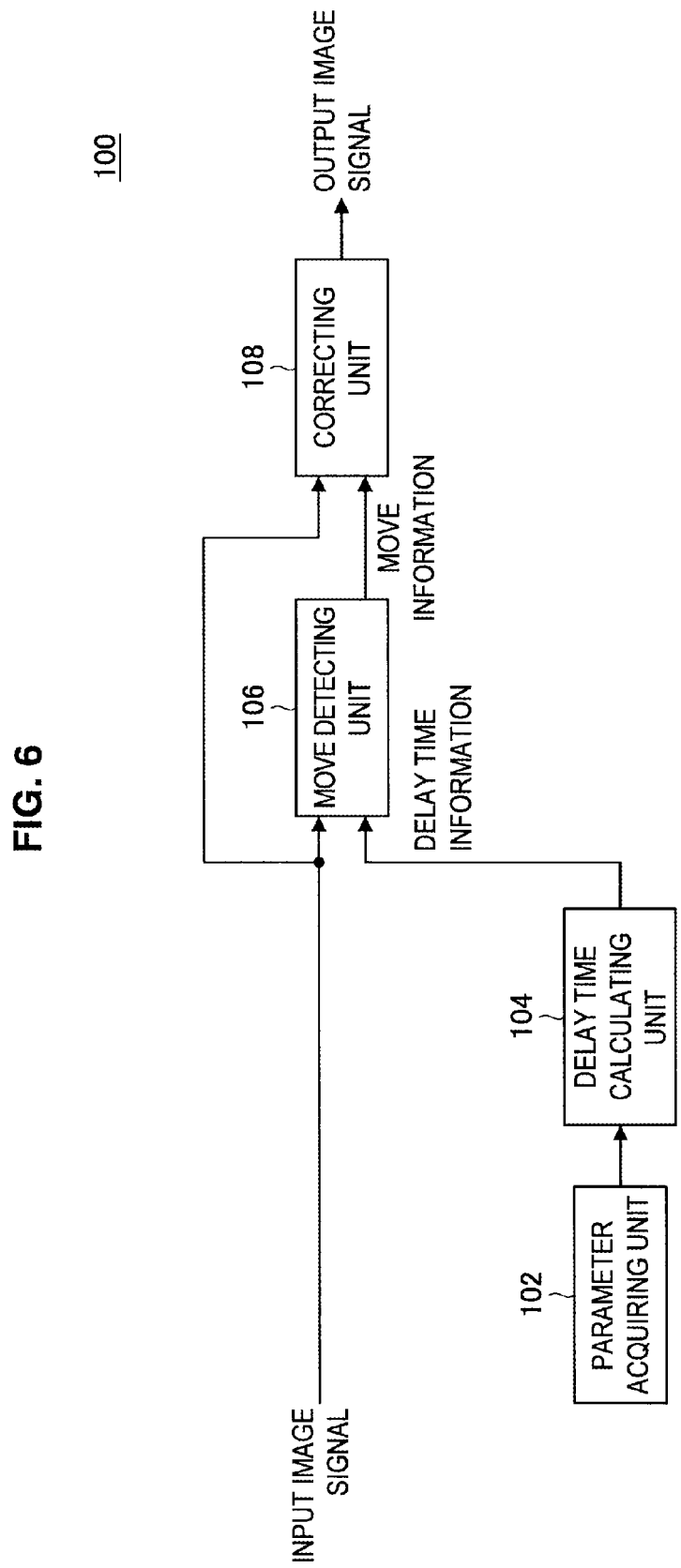
FIG. 6 is a block diagram showing an example of a configuration of an image processing apparatus according to the present embodiment.

FIG. 6 is a block diagram showing an example of a configuration of the image processing apparatus 100 according to the present embodiment. The image processing apparatus 100 includes a parameter acquiring unit 102, a delay time calculating unit 104, a move detecting unit 106, and a correcting unit 108, for example.

The image processing apparatus 100 can be also arranged to include a control unit (not shown), a ROM (Read Only Memory, not shown), a RAM (Random Access Memory, not shown), a storage unit (not shown), an operating unit (not shown) that the user can operate, a display unit (not shown) that displays various screens on a display screen, and a communicating unit (not shown) that communicates with an external apparatus. The image processing apparatus 100 has constituent elements described above connected to each other by a bus as a data transmission path, for example.

The control unit (not shown) controls a whole of the image processing apparatus 100 that is constituted by an MPU (Micro Processing Unit) and various processing circuit. The control unit (not shown) can be also arranged to play a role of the parameter acquiring unit 102, the delay time calculating unit 104, the move detecting unit 106, and the correcting unit 108. The control unit (not shown) can be also arranged to play a role of performing a process to an image signal that is performed with a process according to an image processing method in the present embodiment, such as encoding an image signal (an output image signal) that is processed by the correcting unit 108, recording the encoded image signal in the recording unit (not shown) and/or causing an image indicated by the image signal to be displayed on the display unit (not shown) or a display screen of an external display apparatus.

The ROM (not shown) stores control data such as a program and an arithmetic parameter that are used by the control unit (not shown). The RAM (not shown) temporarily stores a program and the like that is executed by the control unit (not shown).

The storage unit (not shown) is a storing unit that is included in the image processing apparatus 100, and stores various data such as image data and applications, for example. The storage unit (not shown) includes a magnetic recording medium such as a hard disk, and a nonvolatile memory such as an EEPROM (Electrically Erasable and Programmable Read Only Memory) and a flash memory, for example. The storage unit (not shown) can be arranged to be detachable from the image processing apparatus 100.

The operating unit (not shown) includes a rotation-type selector such as a button, a direction key, and a jog dial, or a combination of these units. The image processing apparatus 100 can be also connected to an operation input device (for example, a keyboard and a mouse) as an external apparatus of the image processing apparatus 100, for example.

The display unit (not shown) includes a liquid crystal display (LCD), and an organic EL display (an organic ElectroLuminescence display, or also called an OLED display (an Organic Light Emitting Diode display)), for example. The display unit (not shown) can be also a device that can display and on which a user operation is possible, such as a touch screen, for example. The image processing apparatus 100 can be also connected to a display device (for example, an external display) as an external apparatus of the image processing apparatus 100, regardless of presence or absence of the display unit (not shown).

The communicating unit (not shown) is a communication unit that is included in the image processing apparatus 100, and performs communications with an external apparatus by wireless/by wire via a network (or directly). The communicating unit (not shown) includes a communication antenna and an RF (Radio Frequency) circuit (a wireless communication), an IEEE802.15.1 port and a transmitting/receiving circuit (a wireless communication), an IEEE802.11b port and a transmitting/receiving circuit (a wireless communication), or a LAN (Local Area Network) terminal and a transmitting/receiving circuit (a wire communication), for example. The network according to the present embodiment includes a wire network such as a LAN and a WAN (Wide Area Network), a wireless network such as a wireless WAN (WWAN: Wireless Wide Area Network) via a base station, or the internet that uses a communication protocol such as TCP/IP (Transmission Control Protocol/Internet Protocol).

An example of a process (a process according to the image processing method) of the image processing apparatus 100 is explained below by explaining a configuration example of the image processing apparatus 100 according to the present embodiment shown in FIG. 6.

The parameter acquiring unit 102 acquires an image pickup parameter.

An Example of a Process of Acquiring an Image Pickup Parameter (i) A First Example The parameter acquiring unit 102 acquires identification information for identifying an image pickup apparatus, from a recording medium that stores an input image signal or identification information, for example. The parameter acquiring unit 102 acquires an image pickup parameter corresponding to the acquired identification information, from a database to which identification information and an image pickup parameter are related, for example.

As a method of acquiring identification information from the input image signal, there is a method that the parameter acquiring unit 102 decodes (or causes a decoder to decode) metadata or a watermark that is contained in the input image signal (or that is embedded in the input image signal), for example. The identification information according to the present embodiment includes a model number that indicates a type of an image pickup apparatus, for example. When the information makes it possible to identify an image pickup apparatus, arbitrary information can be used as the identification information.

Although the parameter acquiring unit 102 acquires an image pickup parameter corresponding to identification information from the database that is stored in the storage unit (not shown), a process of the parameter acquiring unit 102 is not limited to this process, for example. For example, the parameter acquiring unit 102 can be arranged to acquire an image pickup parameter corresponding to identification information, from an external apparatus such as a server. In this case, when acquiring an image pickup parameter from the external apparatus, the parameter acquiring unit 102 communicates with the external apparatus via the communicating unit (not shown), transmits identification information and a transmission request for requesting a transmission of the image pickup parameter to the external apparatus, and as a result, takes in the image pickup parameter, for example. In the image processing apparatus 100, the parameter acquiring unit 102 can have a communication function, for example. In the above case, the parameter acquiring unit 102 acquires the image pickup parameter by communicating with the external apparatus, regardless of whether the image processing apparatus 100 includes the communicating unit (not shown).

The recording medium that stores the identification information includes the storage unit (not shown) or the ROM (not shown), for example. However, a recording medium that stores the identification information is not limited to these units. For example, the recording medium that stores the identification can be an external recording medium that is detachable from the image processing apparatus 100. The external recording medium includes a nonvolatile memory such as a flash memory, for example. The identification information that is recorded in the recording medium can be recorded in advance, or can be recorded according to a user operation, for example.

(ii) A Second Example

The parameter acquiring unit 102 can be also arranged to acquire an image pickup parameter from the input image signal, for example. As a method of acquiring the image pickup parameter from the input image signal, there is a method that the parameter acquiring unit 102 decodes (or causes a decoder to decode) metadata or a watermark that is contained in the input image signal (or that is embedded in the input image signal), for example.

(iii) A Third Example

A process of acquiring an image pickup parameter by the parameter acquiring unit 102 according to the present embodiment is not limited to those explained in the first example and the second example. For example, the parameter acquiring unit 102 can be arranged to estimate an image pickup parameter based on move information that indicates a move of a detected subject and acquire the estimated image pickup parameter as the image pickup parameter.

Figure 7:
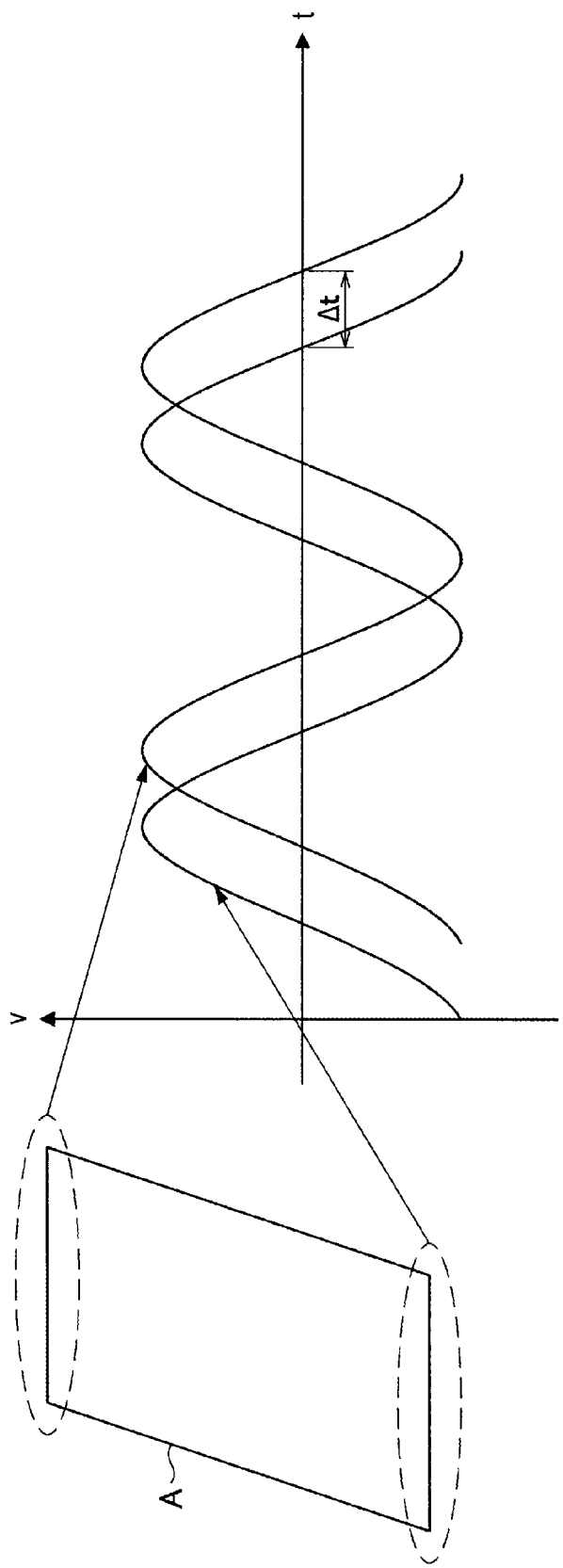
FIG. 7 is an explanatory diagram for explaining an example of a method of estimating an image pickup parameter based on move information according to the present embodiment.

FIG. 7 is an explanatory diagram for explaining an example of a method of estimating an image pickup parameter based on move information according to the present embodiment. When a focal plane distortion occurs as shown by A in FIG. 7, for example, a deviation time Δt occurs in speed between a line of which an image is picked up first and a line of which an image is picked up last in a frame image. The image processing apparatus 100 estimates a delay time $R_{line}$ based on the deviation time Δt and a number of lines, for example. More specifically, the image processing apparatus 100 estimates the delay time $R_{line}$ by calculating "Δt/number of lines", for example. A method of estimating an image pickup parameter according to the present embodiment is not limited to a method described above. For example, the image processing apparatus 100 can be arranged to estimate an image pickup parameter from arbitrary information that indicates a distortion.

An example of a configuration of the image processing apparatus 100 according to the present embodiment is explained with reference to FIG. 6 again. The parameter acquiring unit 102 acquires an image pickup parameter by performing the processes explained in the first example to the third example above, for example. It is needless to mention that a process of acquiring an image pickup parameter by the parameter acquiring unit 102 according to the present embodiment is not limited to those explained in the first example to the third example above.

Although the parameter acquiring unit 102 can be realized by an exclusive processing circuit having an arbitrary configuration to perform the process of acquiring an image pickup parameter as described above, a configuration of the parameter acquiring unit 102 is not limited to that described above, for example. In the image processing apparatus 100, the control unit (not shown) can be also arranged to play a role of the parameter acquiring unit 102, and the parameter acquiring unit 102 can be a general-purpose processing circuit that can perform other process, for example.

Although FIG. 6 shows a configuration that the image processing apparatus 100 includes the parameter acquiring unit 102, a configuration of the image processing apparatus 100 according to the present embodiment is not limited to that described above. For example, the image processing apparatus 100 can be also arranged to perform a process by using an image pickup parameter that is acquired by a parameter acquiring apparatus which is separate from the image processing apparatus 100, without including the parameter acquiring unit 102.

Although FIG. 6 shows an example that the image processing apparatus 100 includes the parameter acquiring unit 102 that acquires an image pickup parameter, a configuration of the image processing apparatus 100 according to the present embodiment is not limited to that described above. For example, the image processing apparatus 100 can be arranged to include a delay-time information acquiring unit (not shown) that acquires delay time information, in place of the parameter acquiring unit 102. In this case, the delay-time information acquiring unit (not shown) acquires delay time information by performing a process similar to those in the first example and the second example of a process of acquiring an image pickup parameter, for example. However, a process of acquiring delay time information according to the present embodiment is not limited to that described above. It is needless to mention that the image processing apparatus 100 according to the present embodiment can be arranged to further include the delay-time information acquiring unit (not shown) in addition to the configuration shown in FIG. 6.

The delay time calculating unit 104 calculates a delay time of an image pickup for each pixel, based on the image pickup parameter acquired by the parameter acquiring unit 102.

Figure 8:
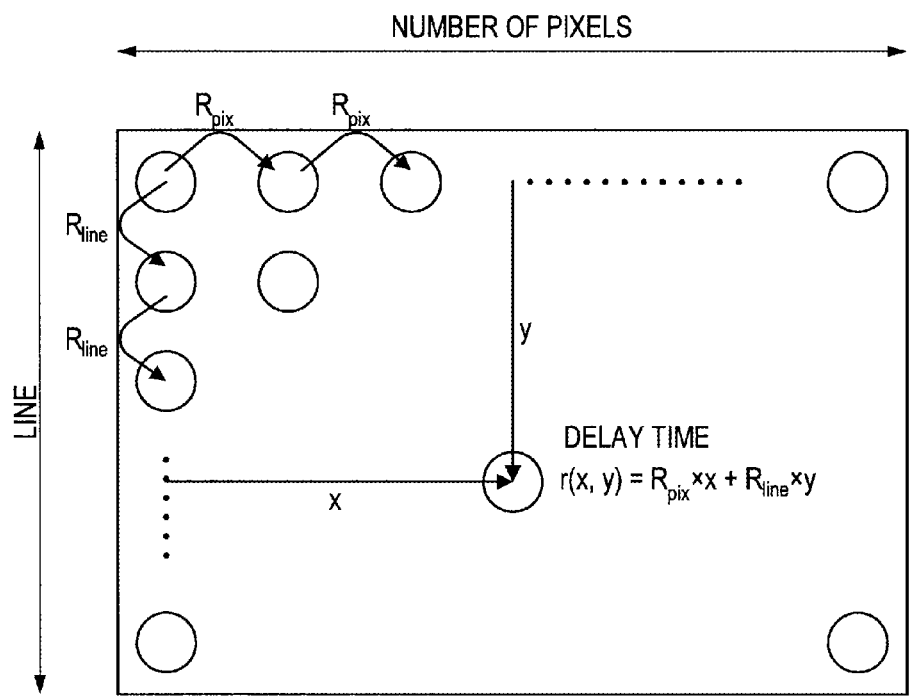
FIG. 8 is an explanatory diagram for explaining an example of a method of calculating a delay time in the image processing apparatus according to the present embodiment.

FIG. 8 is an explanatory diagram for explaining an example of a method of calculating a delay time in the image processing apparatus 100 according to the present embodiment.

When the image pickup apparatus performs scanning and reading in a raster scan order, a delay in a pixel at an upper left side shown in FIG. 8 can be set to "0". In the above case, a delay time of an arbitrary pixel is calculated by Equation 1 shown below when coordinates of the pixel are (x, y), for example. In this case, "$R_{pix}$" shown in Equation 1 is a delay time between adjacent pixels in the same line, and "$R_{line}$" shown in Equation 1 is a delay time between adjacent lines.

$$r(x,y) = R_{pix} \times x + R_{line} \times y \qquad \text{Equation 1}$$

The delay time calculating unit 104 calculates a delay time for each pixel by Equation 1, for example, and transmits delay time information indicating the calculated delay time to the move detecting unit 106. A method of calculating a delay time by the delay time calculating unit 104 is not limited to that described above. For example, when the parameter acquiring unit 102 acquires an image pickup parameter that indicates a position of an image pickup element that starts exposure and reading such as an image pickup parameter that indicates that exposure and reading are performed from an upper left side of image pickup elements and from a lower left side of the image pickup elements, the delay time calculating unit 104 can be arranged to calculate a delay time r(x, y) in each pixel by setting a delay of each of plural pixels corresponding to the position to "0".

The delay time calculating unit 104 can be realized by an exclusive processing circuit having an exclusive configuration to perform a process according to a method of calculating a delay time as described above, for example. However, a configuration of the delay time calculating unit 104 is not limited to that described above. For example, in the image processing apparatus 100, the control unit (not shown) can be arranged to play a role of the delay time calculating unit 104, or can be a general-purpose processing circuit that can perform other process.

Although FIG. 6 shows an example that the image processing apparatus 100 includes the delay time calculating unit 104 that calculates a delay time of an image pickup by the image processing apparatus 100 for each pixel, a configuration of the image processing apparatus 100 according to the present embodiment is not limited to that described above. For example, the image processing apparatus 100 can be arranged not to include the delay time calculating unit 104, when the image processing apparatus 100 includes the delay-time information acquiring unit (not shown). In the case of a configuration described above, in the image processing apparatus 100, the delay-time information acquiring unit (not shown) transmits delay time information to the move detecting unit 106, for example.

The move detecting unit 106 detects a move of a subject contained in a moving image from plural frame images, based on the input image signal and delay time information. The delay time information that the move detecting unit 106 uses includes delay time information that is transmitted from the delay time calculating unit 104 and delay time information that is transmitted from the delay-time information acquiring unit (not shown).

(I) A First Configuration Example

The move detecting unit 106 according to a first configuration example specifies a time phase when a moving image is picked up based on delay time information, and detects a move of a subject for each pixel based on the specified time phase. A process of the move detecting unit 106 according to the first configuration example corresponds to a process of detecting a move based on a corrected image.

Figure 9:
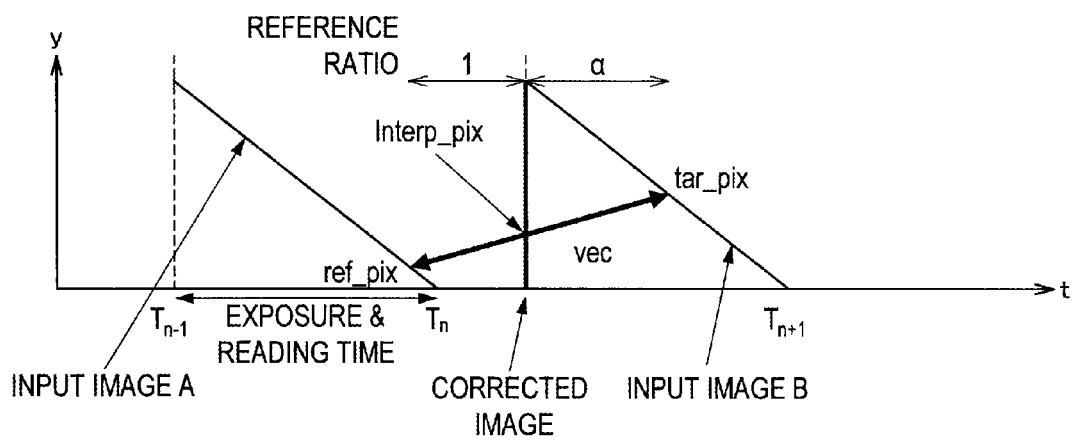
FIG. 9 is an explanatory diagram showing an outline of a process in a first configuration example of a move detecting unit included in the image processing apparatus according to the present embodiment.

FIG. 9 is an explanatory diagram showing an outline of a process in the first configuration example of the move detecting unit 106 included in the image processing apparatus 100 according to the present embodiment. The move detecting unit 106 according to the first configuration example specifies, as a time phase, a reference ratio (1:α) for referring to each of two frame images for each pixel, for the two frame images that correspond to continuous two frames, for example. Then, the move detecting unit 106 according to the first configuration example detects a subject by using the specified reference ratio. Although FIG. 9 shows an example that the move detecting unit 106 according to the first configuration example specifies, as a time phase, a reference ratio for referring to two frame images that correspond to continuous two frames, a process of the move detecting unit 106 according to the first configuration example is not limited to that described above. For example, the move detecting unit 106 according to the first configuration example can be also arranged to specify, as a time phase, a reference ratio for referring to three or more frame images that correspond to three or more frames. An example is explained below that the move detecting unit 106 according to the first configuration example specifies, as a time phase, a reference ratio for referring to two frame images that correspond to continuous two frames, as shown in FIG. 9, for example.

Figure 10:
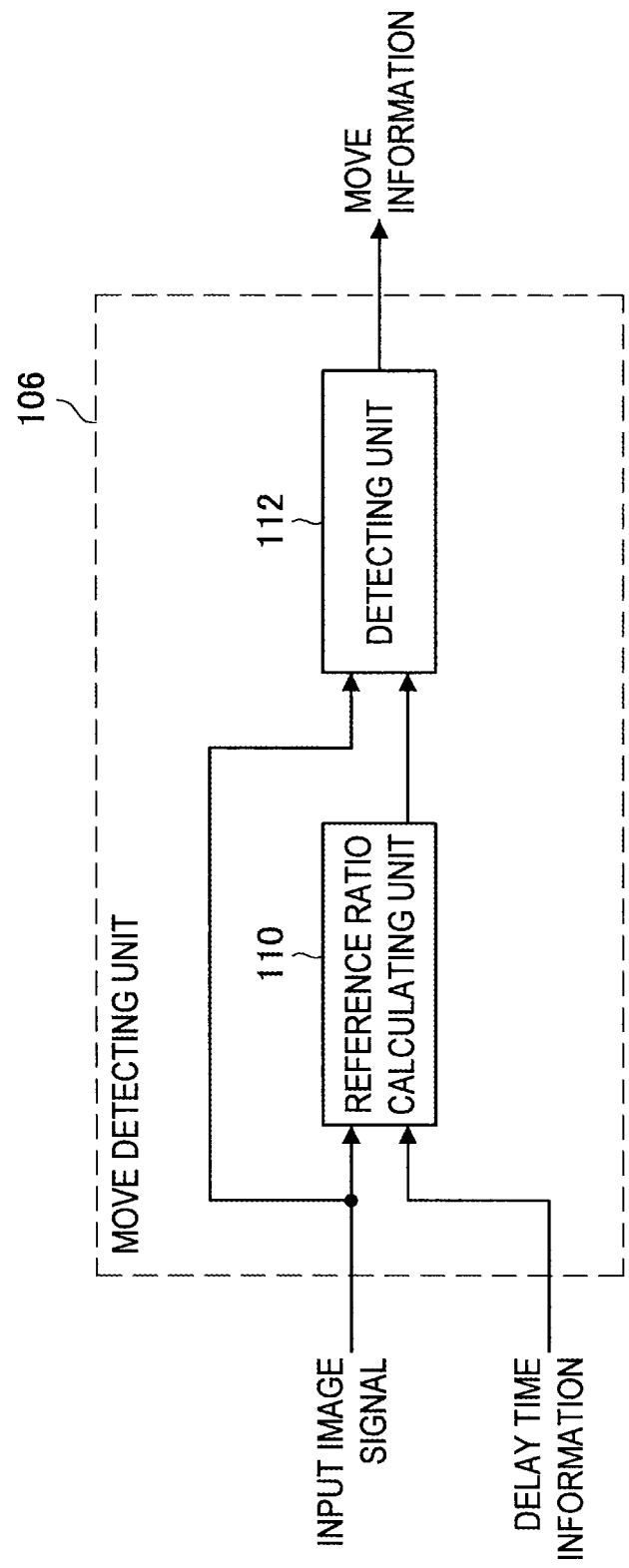
FIG. 10 is a block diagram showing the first configuration example of the move detecting unit included in the image processing apparatus according to the present embodiment.

FIG. 10 is a block diagram showing the first configuration example of the move detecting unit 106 included in the image processing apparatus 100 according to the present embodiment. The move detecting unit 106 according to the first configuration example includes a reference ratio calculating unit 110 and a detecting unit 112 (a first detecting unit), for example.

The reference ratio calculating unit 110 calculates a reference ratio for each pixel, based on the input image signal and the delay time information transmitted from the delay time calculating unit 104. The reference ratio calculating unit 110 transmits information (data) that indicates the calculated reference ratio to the detecting unit 112.

Figure 11:
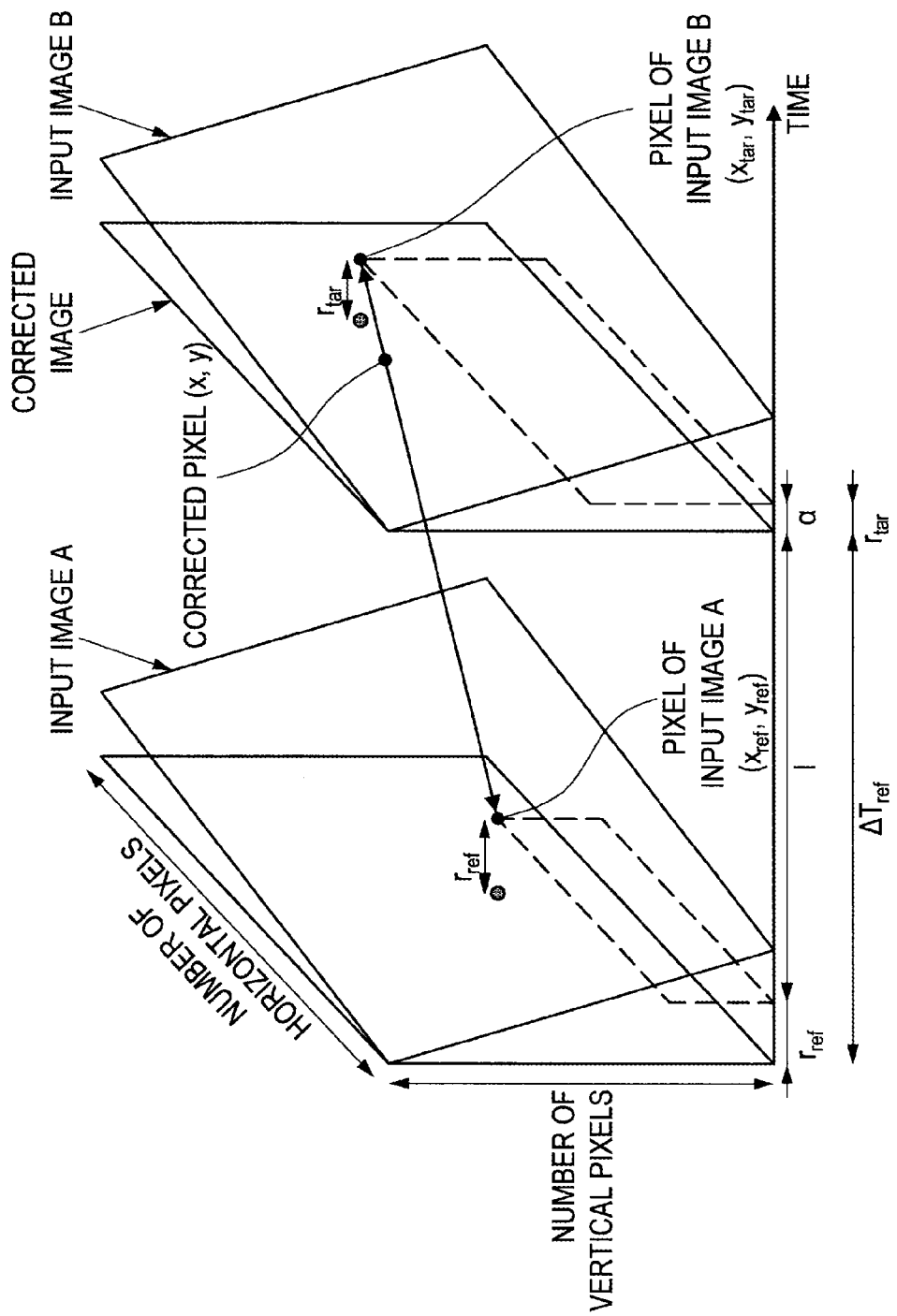
FIG. 11 is an explanatory diagram for explaining an example of a calculation process of a reference ratio by the move detecting unit according to the first configuration example included in the image processing apparatus according to the present embodiment.

FIG. 11 is an explanatory diagram for explaining an example of a calculation process of a reference ratio by the move detecting unit 106 according to the first configuration example included in the image processing apparatus 100 according to the present embodiment. A corrected pixel shown in FIG. 11 is a pixel in a corrected image (this is similarly applied hereinafter). Hereinafter, there is a case where a pixel that corresponds to a corrected pixel in the input image (a frame image) that corresponds to the corrected pixel is expressed as "reference pixel".

A general move detection that is used in a frame rate conversion and the like, for example, is performed in a time phase in the global shutter system. On the other hand, the move detecting unit 106 (more strictly, the reference ratio calculating unit 110, for example) according to the first configuration example according to the present embodiment detects a move of a subject for each pixel, by taking account of a delay time in the image pickup apparatus that picks up the moving image corresponding to the input image signal by using delay time information.

For example, assume that a ratio between a time from a corrected pixel to a reference pixel of an input image A shown in FIG. 11 and a time from the corrected pixel to a reference pixel of an input image B is "1:α", and that a vector from the corrected pixel to the reference pixel of the input image A is "$(x_{srch}, y_{srch})$". Based on these assumptions, coordinates $(x_{ref}, y_{ref})$ of the reference pixel of the input image A, coordinates $(x_{tar}, y_{tar})$ of the reference pixel of the input image B, a delay time $r_{ref}$ of the reference pixel of the input image A, and a delay time $r_{tar}$ of the reference pixel of the input image B are expressed by Equations 2 to 5 shown below.

$$(x_{ref}, y_{ref}) = (x + x_{srch}, y + y_{srch}) \quad \text{Equation 2}$$

$$(x_{tar}, y_{tar}) = (x - \alpha \times x_{srch}, x - \alpha \times y_{srch}) \quad \text{Equation 3}$$

$$r_{ref} = r(x + x_{srch}, y + y_{srch}) \quad \text{Equation 4}$$

$$r_{tar} = r(x - \alpha \times x_{srch}, y - \alpha \times y_{srch}) \quad \text{Equation 5}$$

In this case, when a frame cycle of the input image signal is assumed as "$\Delta T_{ref}$", the delay time $r_{tar}$ of the reference pixel of the input image B is expressed by Equation 6 shown below, for example.

$$r_{tar} = (\Delta T_{ref} - r_{ref}) \times \alpha \quad \text{Equation 6}$$

Further, "α" relating to a ratio of a time from the corrected pixel to the reference pixel of the input image B is expressed by Equation 7 shown below, from Equations 1, 3, 4, and 6.

$$\alpha = \frac{R_{pix} \times x + R_{line} \times y}{\Delta T_{ref} - R_{pix} \times x - R_{line} \times y} \quad \text{Equation 7}$$

Further, "α" is not limited to be calculated by only Equation 7. For example, in general, a delay time $R_{pix}$ between adjacent pixels of the same line is much smaller than a delay time $R_{line}$ between adjacent pixels of the same line (that is, $R_{pix} \ll R_{line}$). Therefore, "α" can be expressed by Equation 8 shown below.

$$\alpha \approx \frac{R_{line} \times y}{\Delta T_{ref} - R_{line} \times y} \quad \text{Equation 8}$$

Although FIG. 11 shows an example that a frame image (an input image) of continuous two frames is a reference image, a method of calculating a reference ratio by the move detecting unit 106 according to the first configuration example according to the present embodiment is not limited to that described above.

Figure 12:
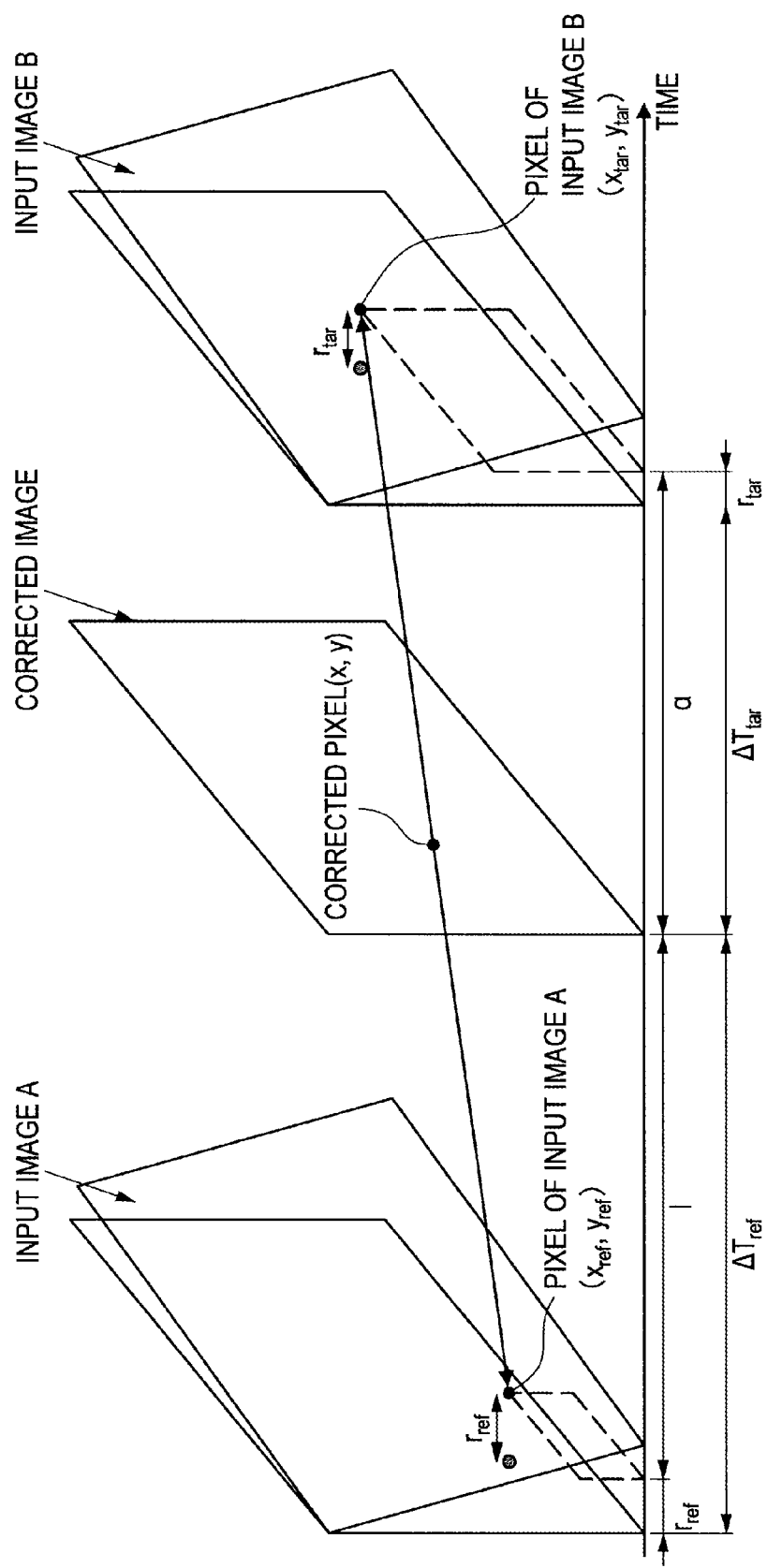
FIG. 12 is an explanatory diagram for explaining other example of a calculation process of a reference ratio by the move detecting unit according to the first configuration example included in the image processing apparatus according to the present embodiment.

FIG. 12 is an explanatory diagram for explaining other example of a calculation process of a reference ratio by the move detecting unit 106 according to the first configuration example included in the image processing apparatus 100 according to the present embodiment. FIG. 12 shows an example that the move detecting unit 106 according to the first configuration example uses a frame image (an input image) of arbitrary two frames as a reference image.

An interval between a frame corresponding to the input image A and a frame (hereinafter, "corrected frame") corresponding to a corrected image is assumed as "$\Delta T_{ref}$", and an interval between the corrected frame and a frame corresponding to the input image B is assumed as "$\Delta T_{tar}$". Then, "α" relating to a ratio of a time from the corrected pixel to the reference pixel of the input image B is expressed by Equation 9 shown below, for example. Further, "α" can be expressed from $R_{pix} \ll R_{line}$ by Equation 10 shown below, for example.

$$\alpha = \frac{\Delta T_{tar} + R_{pix} \times x + R_{line} \times y}{\Delta T_{ref} - R_{pix} \times x - R_{line} \times y} \quad \text{Equation 9}$$

$$\alpha \approx \frac{\Delta T_{tar} + R_{line} \times y}{\Delta T_{ref} - R_{line} \times y} \quad \text{Equation 10}$$

The reference ratio calculating unit 110 calculates a reference ratio for each pixel, by performing the following calculation, for example. As expressed by Equations 8 to 10, for example, the reference ratio of the input image is expressed by delay time information based on a time interval of an image, coordinates (x, y) of the corrected image, and the image pickup parameter. Therefore, the image processing apparatus 100 can detect a move of a subject and correct the input image signal (a move compensation), by using a reference ratio for each pixel calculated as described above. Further, the image processing apparatus 100 can also convert a frame rate by using a reference ratio for each pixel calculated as described above.

Although FIGS. 11 and 12 show examples of using the frame image (an input image) of two frames as a reference image, a calculation method of a reference ratio by the move detecting unit 106 according to the first configuration example according to the present embodiment is not limited to that described above. For example, the move detecting unit 106 according to the first configuration example according to the present embodiment can also use three or more frame images as a reference image.

Examples of calculating a reference ratio when the delay time r(x, y) for each pixel is expressed by Equation 1 are explained above, as shown in FIGS. 11 and 12. However, the delay time r(x, y) for each pixel according to the present embodiment is not limited to be expressed by a function indicated by Equation 1. For example, the delay time r(x, y) for each pixel according to the present embodiment can be also arranged to be expressed by an arbitrary function.

Figure 13:
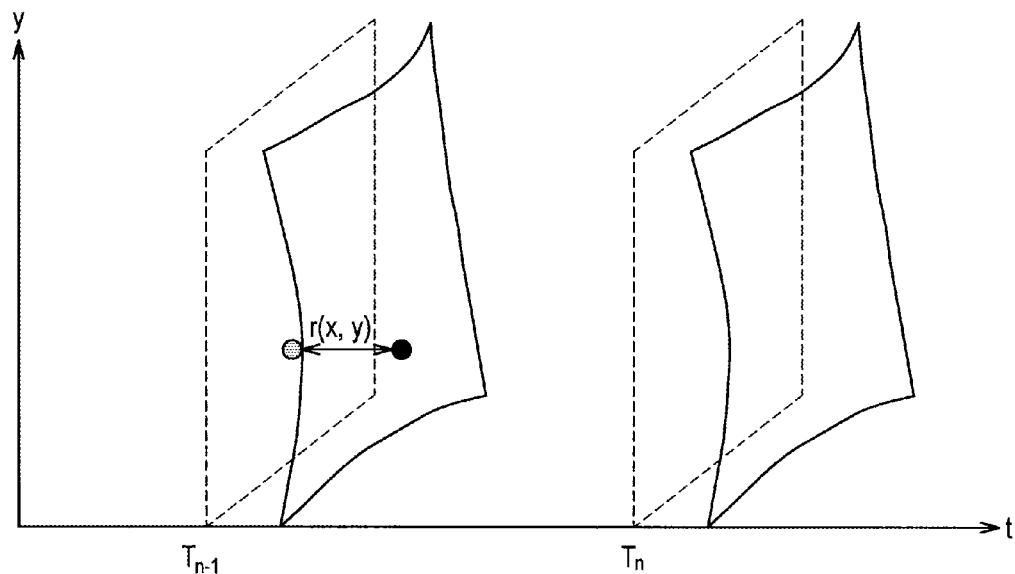
FIG. 13 is an explanatory diagram for explaining other example of a delay time of an image pickup according to the present embodiment.
Figure 14:
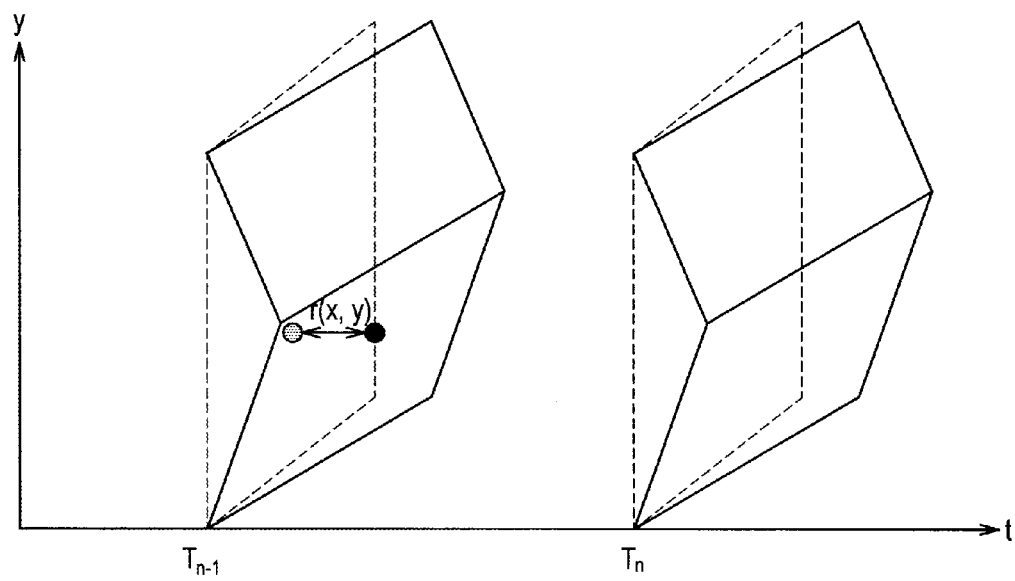
FIG. 14 is an explanatory diagram for explaining other example of a delay time of an image pickup according to the present embodiment.

FIGS. 13 and 14 are explanatory diagrams for explaining other examples of a delay time of an image pickup according to the present embodiment. FIG. 13 shows an example of a frame image when the delay time r(x, y) is an arbitrary function that has coordinates of a pixel in an argument. FIG. 14 shows an example of a frame image when a function that indicates a delay time changes for each certain section of a vertical coordinate (an example that the delay time r(x, y) shown in FIG. 13 is expressed by an arbitrary function). More specifically, FIG. 14 shows an example of a frame image when, in the image pickup apparatus, exposure and reading are performed from an upper left side of an image pickup element and from a lower left side of an image pickup element among the image pickup elements that are included in the image pickup apparatus.

The image processing apparatus 100 that includes the move detecting unit 106 according to the first configuration example can calculate a reference ratio in a similar manner to that when the delay time r(x, y) is expressed by Equation 1, even when the delay time r(x, y) is expressed by an arbitrary function, as shown in FIGS. 13 and 14.

Figure 15:
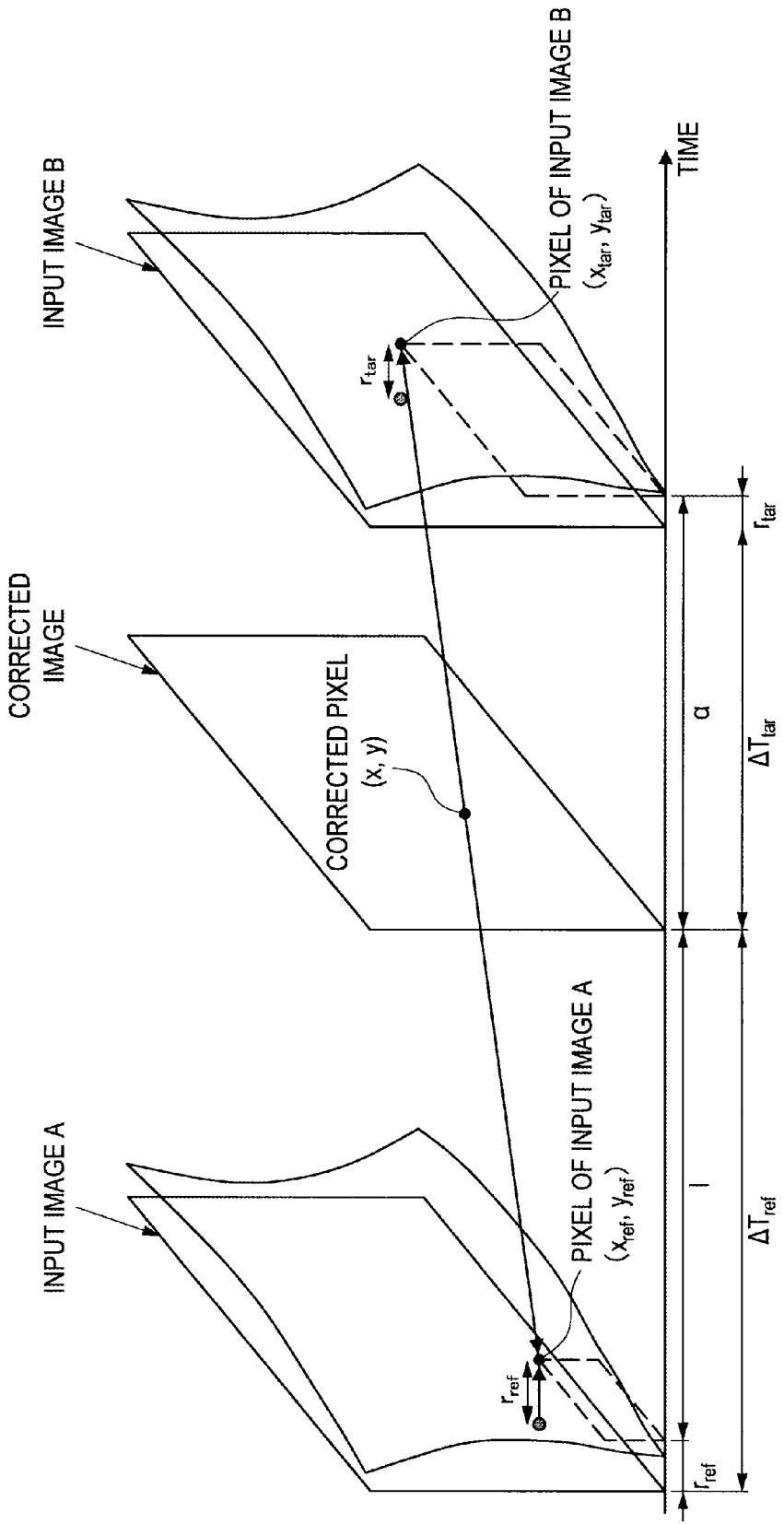
FIG. 15 is an explanatory diagram for explaining other example of a calculation process of a reference ratio by the move detecting unit according to the first configuration example included in the image processing apparatus according to the present embodiment.

FIG. 15 is an explanatory diagram for explaining other example of a calculation process of a reference ratio by the move detecting unit 106 according to the first configuration example included in the image processing apparatus 100 according to the present embodiment. FIG. 15 shows an example that the move detecting unit 106 according to the first configuration example uses a frame image (an input image) of arbitrary two frames, in a similar manner to that explained with reference to FIG. 12.

From Equations 3, 4 and 5, "α" relating to a ratio of a time from the corrected pixel to the reference pixel of the input image B is expressed by Equation 11 shown below, for example. The reference ratio calculating unit 110 can have the delay function r(x, y) set as known, by the delay time information that is transmitted from the delay time calculating unit 104 or by the delay time information that is transmitted from the delay-time information acquiring unit (not shown), for example. Because an unknown number in Equation 11 becomes one as "α", the image processing apparatus 100 can uniquely calculate "α" relating to the ratio of a time from the corrected pixel to the reference pixel of the input image B.

$$\alpha = \frac{\Delta T_{tar} + r(x - \alpha \times x_{srch}, y - \alpha \times y_{srch})}{\Delta T_{ref} - r(x + x_{srch}, y + y_{srch})} \qquad \text{Equation 11}$$

When a function that indicates the delay time r(x, y) is expressed by Equation 1, for example, "α" that is indicated by Equation 11 is expressed by Equation 9. That is, Equation 11 is a generalized expression of Equation 9.

The image processing apparatus 100 that includes the move detecting unit 106 according to the first configuration example can calculate the reference ratio for each pixel, even when the delay time r(x, y) for each pixel is expressed by an arbitrary function.

A calculation method of the reference ratio when the delay time r(x, y) for each pixel is expressed by an arbitrary function is not limited to that described above. For example, as shown in FIG. 14, when a function that indicates a delay time changes for each certain section of the vertical coordinate, the image processing apparatus 100 that includes the move detecting unit 106 according to the first configuration example can be arranged to calculate the reference ratio for each section of the vertical coordinate expressed by the same function.

An example of a configuration of the move detecting unit 106 according to the first configuration example is explained with reference to FIG. 10 again. The detecting unit 112 detects a move of a subject, based on the input image signal, and the reference ratio calculated by the reference ratio calculating unit 110.

As described above, the move detecting unit 106 according to the first configuration example detects a move based on the corrected image. When a move is detected based on the corrected image, an evaluation value and a constraint are obtained by assuming a move (expressed by a vector or an optical flow, for example). The detecting unit 112 determines a move vector (an optical flow) to the input image, by using the reference ratio calculated by the reference ratio calculating unit 110, for example. The detecting unit 112 determines a move vector by using an arbitrary method capable of detecting a move such as a block matching method and a gradient method, for example.

Figure 16:
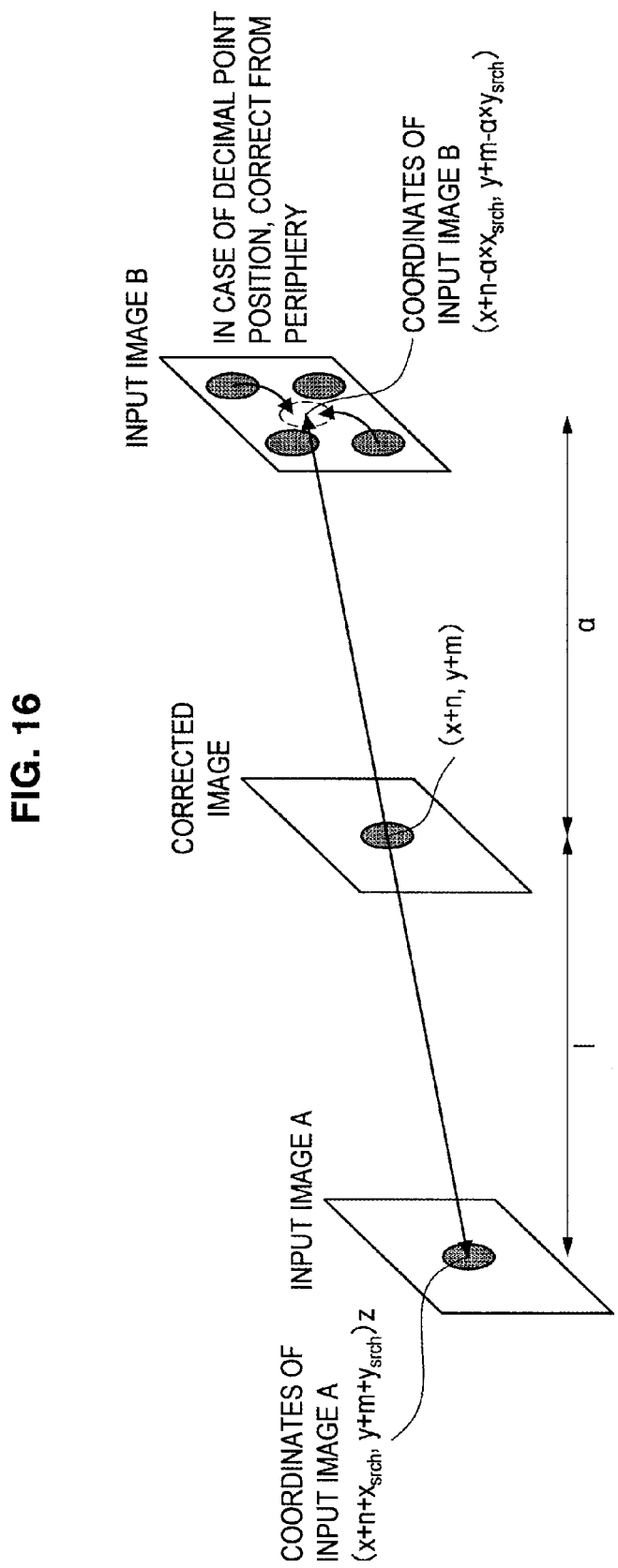
FIG. 16 is an explanatory diagram for explaining an example of a move detection process of the move detecting unit according to the first configuration example included in the image processing apparatus according to the present embodiment.

FIG. 16 is an explanatory diagram for explaining an example of a move detection process of the move detecting unit 106 according to the first configuration example included in the image processing apparatus 100 according to the present embodiment. FIG. 16 shows an example that the move detecting unit 106 detects a move of a corrected image basis by using a block matching, from two frame images (an input image).

For example, from FIG. 8, a search position (coordinates) of the input image A corresponding to coordinates (x, y) of the corrected pixel is expressed as $(x+x_{srch}, y+y_{srch})$, and a search position (coordinates) of the input image B corresponding to coordinates (x, y) of the corrected pixel is expressed as $(x-\alpha \times x_{srch}, y-\alpha \times y_{srch})$. Therefore, a pixel value of the reference position of the input image A and a pixel value of the reference position of the input image B are expressed by Equations 12 and 13 shown below, for example.

A pixel value of the reference position of the input image $A = f(x+x_{srch}, y+y_{srach})$  Equation 12

A pixel value of the reference position of the input image $B = f(x-\alpha \times x_{srch}, y-\alpha \times y_{srch})$  Equation 13

Assume that "n" represents a move quantity from the reference position within a block to an x-axis direction and that "m" represents a move quantity form the reference position within a block to a y-axis direction. Then, the reference positions of the input image A and the input image B are expressed by Equations 14 and 15, respectively shown below.

A reference position of the input image $A = (x+n+x_{srch}, y+m+y_{srch})$  Equation 14

A reference position of the input image $B = (x+n-\alpha \times x_{srch}, y+m-\alpha \times y_{srch})$  Equation 15

When a coordinate range of a block is expressed as (x−M, y−N) to (x+M, y+N), an evaluation value $e_{xy}(x_{srch}, y_{srch})$ of a move is expressed by Equation 16 shown below, for example.

$$e_{xy}(x_{srch}, y_{srch}) = \sum_{x=-M}^{M} \sum_{n=-N}^{N} |f(x+n+x_{srch}, y+m, +y_{srch}) - f(x+n-\alpha \times x_{srch}, y+m-\alpha \times y_{srch})| \qquad \text{Equation 16}$$

The detecting unit 112 detects a move by performing a calculation as described above. Then, the detecting unit 112 transmits a reference position (coordinates of a reference pixel) of each input image and a reference ratio corresponding each reference position to the correcting unit 108 as move information.

A calculation method of a move by the move detecting unit 106 according to the first configuration example according to the present embodiment is not limited to that described above. For example, the move detecting unit 106 according to the first configuration example can be arranged to reduce a number of pixels within a block used for convolution to an arbitrary number when the block matching is used. The move detecting unit 106 according to the first configuration example can be also arranged to detect a move by a gradient method using a reference ratio of the input image when assuming an optical flow to be used in a constraint. The move detecting unit 106 according to the first configuration example can improve precision of a detection result of a move, by calculating plural moves obtained from plural input images.

The move detecting unit 106 according to the first configuration example detects a move based on the corrected image, and transmits move information of the detected move to the correcting unit 108, by the configuration shown in FIG. 10, for example. The move detecting unit 106 according to the first configuration example can be realized by an exclusive processing circuit having an arbitrary configuration capable of performing a move detection process as described above, for example. However, a configuration of the move detecting unit 106 according to the first configuration example is not limited to that described above. For example, in the image processing apparatus 100, the control unit (not shown) can be arranged to play a role of the move detecting unit 106 according to the first configuration example, or the move detecting unit 106 according to the first configuration example can be a general-purpose processing circuit capable of also performing other process.

(II) A Second Configuration Example

The move detecting unit 106 according to a second configuration example detects a move of a subject by detecting a move at two stages. More specifically, the move detecting unit 106 according to the second configuration example first detects a move of a subject based on an input image signal. Then, the move detecting unit 106 according to a second configuration example redetects a move of a subject based on move information that indicates the move detected based on the input image signal, the input image signal, and delay time information that is detected from the delay time calculating unit 104. A process of the move detecting unit 106 according to the second configuration example corresponds to a process when detecting a move based on the input image (a frame image).

Figure 17:
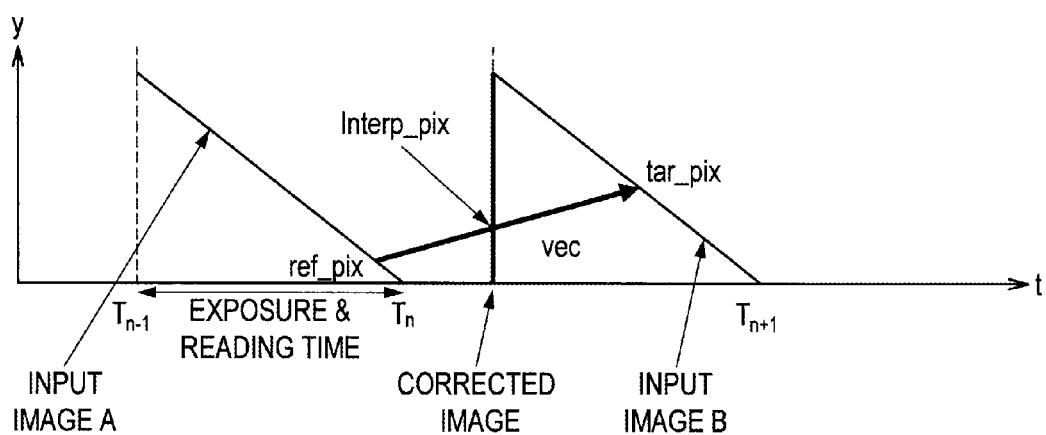
FIG. 17 is an explanatory diagram showing an outline of a process in a second configuration example of a move detecting unit included in the image processing apparatus according to the present embodiment.

FIG. 17 is an explanatory diagram showing an outline of a process in the second configuration example of the move detecting unit 106 included in the image processing apparatus 100 according to the present embodiment. When detecting a move based on the input image, the move detecting unit 106 according to the second configuration example detects the move based on two frame images corresponding to continuous two frames, for example. Then, the move detecting unit 106 according to the second configuration example recalculates a move quantity at a position of the corrected image based on the delay time information. By performing the recalculation as described above, it is possible to compensate for a delay time of an image pickup. Although FIG. 17 shows an example that the move detecting unit 106 according to the second configuration example performs a process based on two frame images corresponding to continuous two frames, a process of the move detecting unit 106 according to the second configuration example is not limited to that described above. For example, the move detecting unit 106 according to the second configuration example can be arranged to perform a process based on frame images corresponding to arbitrary two frames respectively or three or more frame images corresponding to three or more frames respectively. An example that the move detecting unit 106 according to the second configuration example performs a process based on two frame images corresponding to two frames is explained below.

Figure 18:
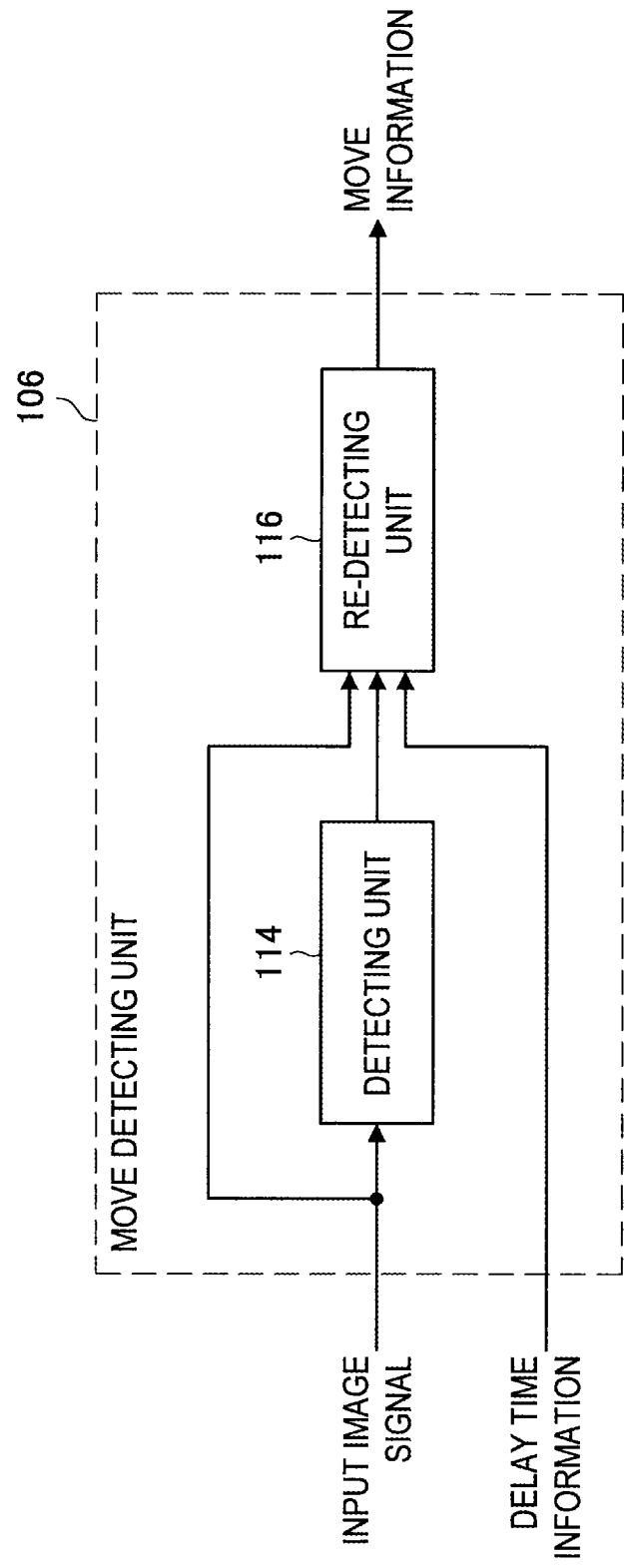
FIG. 18 is a block diagram showing the second configuration example of the move detecting unit included in the image processing apparatus according to the present embodiment.

FIG. 18 is a block diagram showing the second configuration example of the move detecting unit 106 included in the image processing apparatus 100 according to the present embodiment. The move detecting unit 106 according to the second configuration example includes a detecting unit 114 (a second detecting unit) and a re-detecting unit 116 (a third detecting unit), for example.

The detecting unit 114 detects a move of a subject based on an input image signal. Then, the detecting unit 114 transmits move information that indicates the detected move, to the re-detecting unit 116.

The detecting unit 114 calculates a move and a corresponding point in a frame image corresponding to each corrected pixel, by using an arbitrary method capable of detecting a move such as the block matching and the gradient method.

That is, the detecting unit 114 can use a general move detecting method that is used for a frame conversion, for example, without taking account of a delay time of an image pickup for each pixel due to a delay attributable to exposure and reading.

The re-detecting unit 116 redetects a move of a subject based on the move information transmitted from the detecting unit 114, the input image signal, and the delay time information transmitted from the delay time calculating unit 104.

In the case of performing a move detection based on the input image, it is necessary that the detecting unit 114 obtains coordinates of the corrected image from a corresponding point obtained based on the input image signal. The move detecting unit 106 (more strictly, the re-detecting unit 116, for example) according to the second configuration example according to the present embodiment obtains coordinates of the corrected image, by taking account of a delay time in the image pickup apparatus that picks up the moving image corresponding to the input image signal by using delay time information. That is, the move detecting unit 106 according to the second configuration example specifies a time phase when a moving image is picked up based on the delay time information, and detects a move of a subject for each pixel based on the specified time phase, in a similar manner to that performed by the move detecting unit 106 according to the first configuration example.

Figure 19:
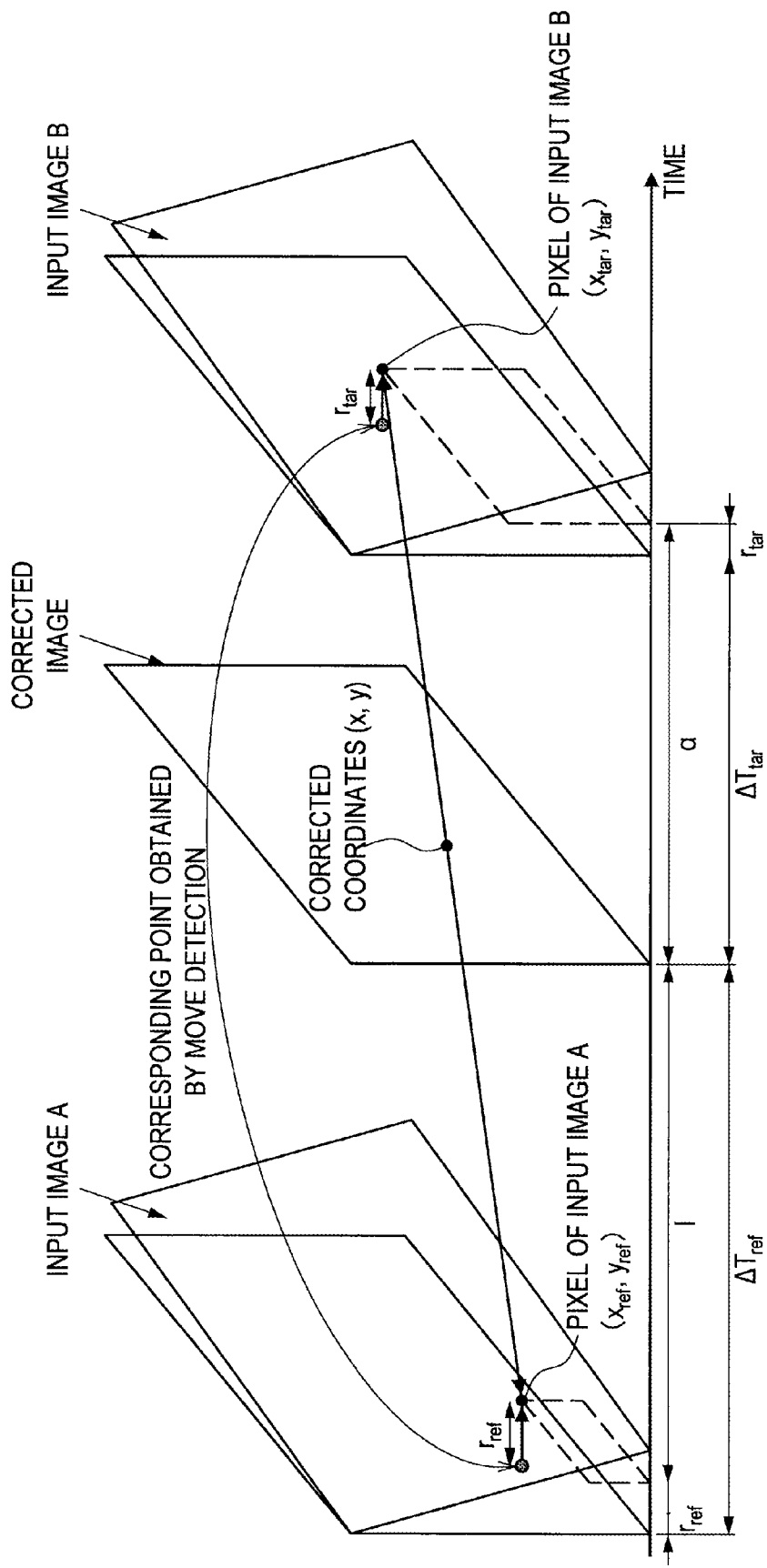
FIG. 19 is an explanatory diagram for explaining an example of a calculation process of a reference ratio by the move detecting unit according to the second configuration example included in an image processing apparatus 100 according to the present embodiment.

FIG. 19 is an explanatory diagram for explaining an example of a calculation process of a reference ratio by the move detecting unit 106 according to the second configuration example included in the image processing apparatus 100 according to the present embodiment.

Assume that coordinates of a pixel at a corresponding point of the input image A that is obtained based on the input image signal are "$(x_{ref}, y_{ref})$" and that coordinates of a pixel at a corresponding point of the input image B that is obtained based on the input image signal are "$(x_{tar}, y_{tar})$". Then, a delay time $r_{ref}$ of an image pickup of each pixel of the input image A and a delay time $r_{tar}$ of an image pickup of each pixel of the input image B are expressed by Equations 17 and 18 shown below, for example, from Equation 1 described above.

$$r_{ref} = r(x_{ref}, y_{ref}) \qquad \text{Equation 17}$$

$$r_{tar} = r(x_{tar}, y_{tar}) \qquad \text{Equation 18}$$

As shown in FIG. 19, assume that a ratio of a time interval between the corrected frame and a frame corresponding to the input image A to a time interval between the corrected frame and a frame corresponding to the input image B is "$1:\alpha$". Also, assume that an interval between the frame corresponding to the input image A and the corrected frame is "$\Delta T_{ref}$" and that an interval between the corrected frame and the frame corresponding to the input image B is "$\Delta T_{tar}$". Then, "$\alpha$" that relates to a ratio of a time from the corrected pixel to the reference pixel of the input image B is expressed by Equation 19 shown below, for example, from Equations 1, 17, and 18 described above. Further, "$\alpha$" can be calculated by Equation 20 shown below, for example, from $R_{pix} \ll R_{line}$.

$$\alpha = \frac{\Delta T_{tar} + r_{tar}}{\Delta T_{ref} - r_{ref}} = \frac{\Delta T_{tar} + R_{pix} \times x_{tar} + R_{line} \times y_{tar}}{\Delta T_{ref} - R_{pix} \times x_{ref} - R_{line} \times y_{ref}} \qquad \text{Equation 19}$$

$$\alpha \approx \frac{\Delta T_{tar} + R_{line} \times y_{tar}}{\Delta T_{ref} - R_{line} \times y_{ref}} \qquad \text{Equation 20}$$

The coordinates (x, y) of the corrected image corresponding to $(x_{ref}, y_{ref})$, $(x_{tar}, y_{tar})$ is expressed by Equation 21 shown below, for example.

$$(x, y) = \left( \frac{\alpha}{1+\alpha} \times x_{ref} + \frac{1}{1+\alpha} \times x_{tar}, \frac{\alpha}{1+\alpha} \times y_{ref} + \frac{1}{1+\alpha} \times y_{tar} \right)$$ Equation 21

Figure 20:
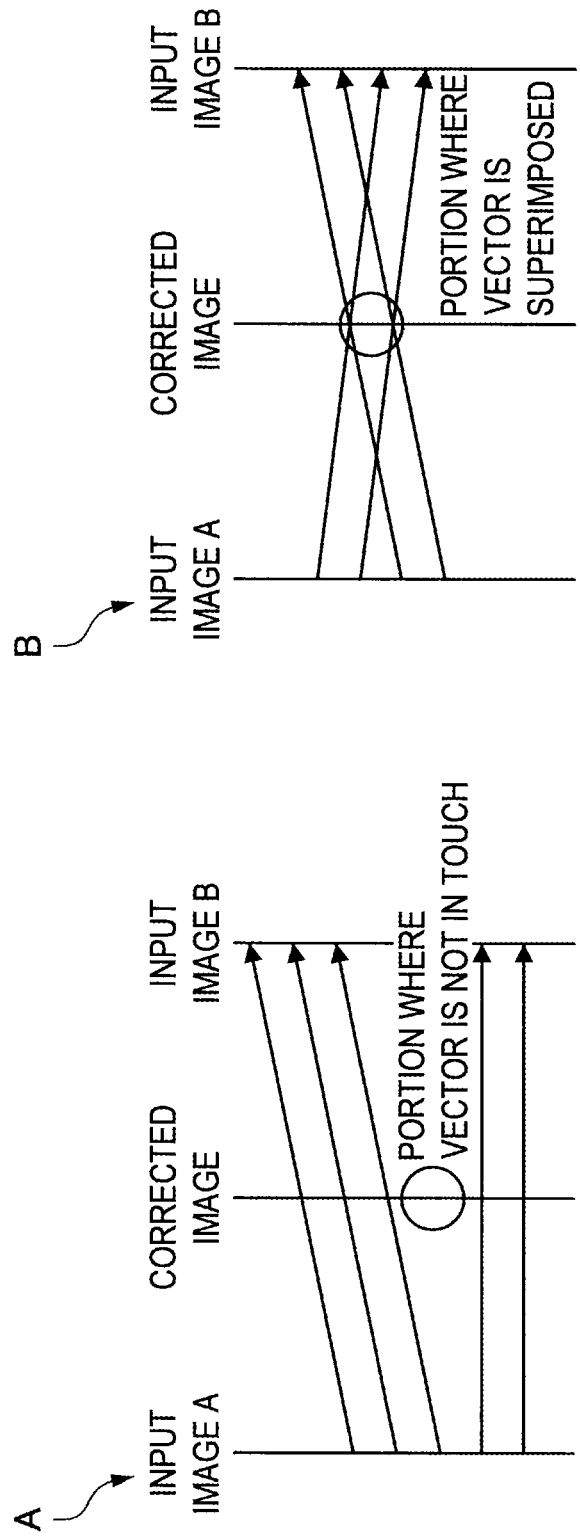
FIGS. 20A and 20B are explanatory diagrams showing an example of a difficulty that has a possibility of occurrence in a process of a calculation process of a reference ratio by the move detecting unit according to the second configuration example included in the image processing apparatus according to the present embodiment.

When the coordinates (x, y) of the corrected image is obtained by performing a calculation expressed by Equation 21, for example, there is a risk of occurrence of a pixel with which a vector is not in touch in the corrected image and occurrence of superimposition of plural vectors. FIGS. 20A and 20B are explanatory diagrams showing an example of a difficulty that has a possibility of occurrence in a process of a calculation process of a reference ratio by the move detecting unit 106 according to the second configuration example included in the image processing apparatus 100 according to the present embodiment.

The move detecting unit 106 according to the second configuration example prevents occurrence of a pixel with which a vector is not in touch in the corrected image, by performing an interpolation by using information of a peripheral pixel in the corrected image, for example. The move detecting unit 106 according to the second configuration example solves a difficulty that occurs due to superimposition of plural vectors, by determining an optimum vector by using an evaluation value that is calculated based on the input image signal, for example. The move detecting unit 106 according to the second configuration example can be arranged to use a detection result of plural moves obtained from plural input images, in the above case.

As shown in FIG. 19, an example is explained above that the image processing apparatus 100 calculates a reference ratio for a case where the delay time r(x, y) for each pixel is expressed by Equation 1 described above. However, the delay time r(x, y) for each pixel according to the present embodiment is not limited to be expressed by the function expressed by Equation 1. For example, the delay time r(x, y) for each pixel according to the present embodiment can be expressed by an arbitrary function in a similar manner to that of the move detecting unit 106 according to the first configuration example described above. The image processing apparatus 100 that includes the move detecting unit 106 according to the second configuration example can calculate a reference ratio in a similar manner to that when the delay time r(x, y) described above is expressed by Equation 1, even when the delay time r(x, y) is expressed by an arbitrary function.

Figure 21:
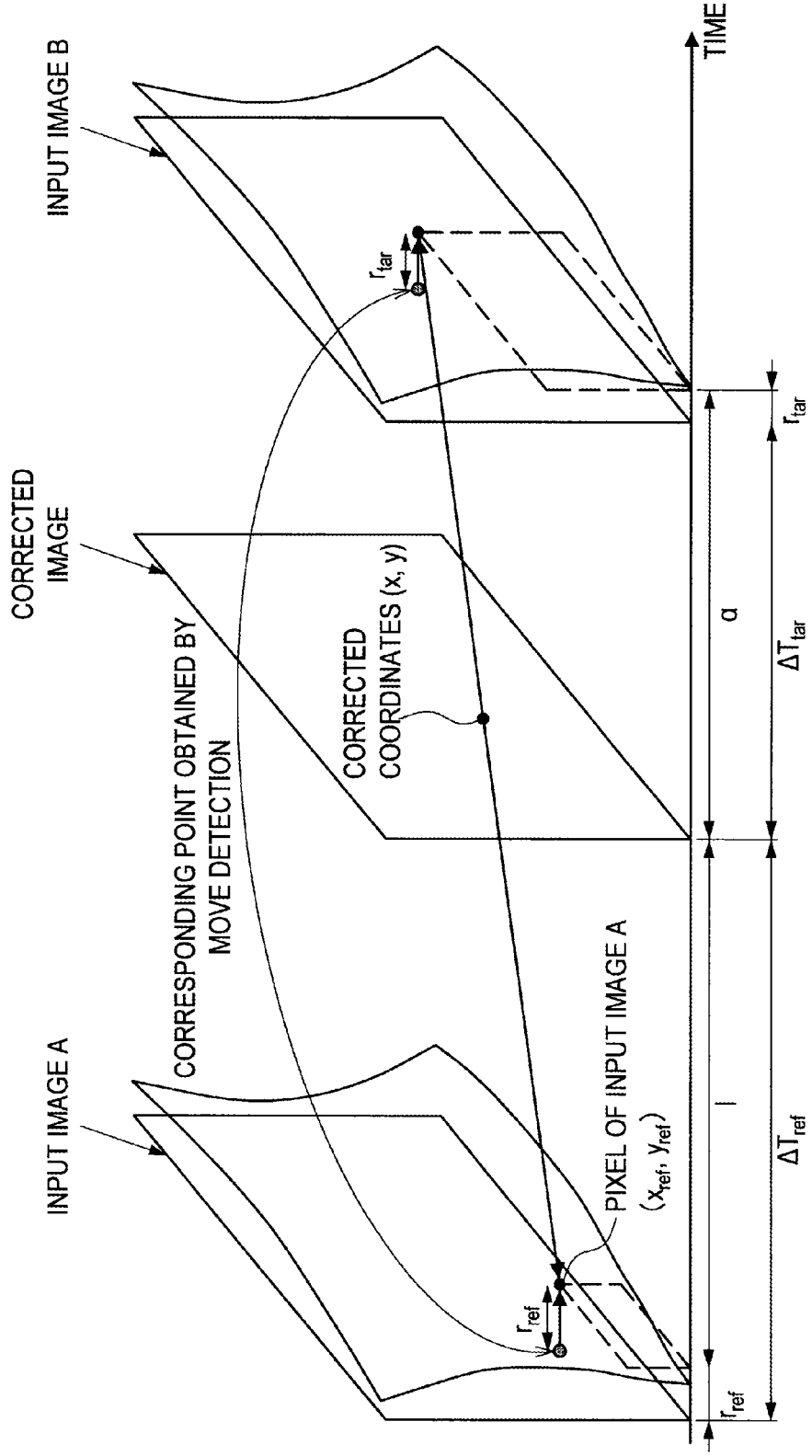
FIG. 21 is an explanatory diagram for explaining other example of a calculation process of a reference ratio by the move detecting unit according to the second configuration example included in the image processing apparatus according to the present embodiment.

FIG. 21 is an explanatory diagram for explaining other example of a calculation process of a reference ratio by the move detecting unit 106 according to the second configuration example included in the image processing apparatus 100 according to the present embodiment.

From Equations 17 and 18, "α" relating to a ratio of a time from the corrected pixel to the reference pixel of the input image B is expressed by Equation 22 shown below, for example. The re-detecting unit 116 can have the delay function r(x, y) set as known, by the delay time information that is transmitted from the delay time calculating unit 104 or by the delay time information that is transmitted from the delay-time information acquiring unit (not shown), for example. The re-detecting unit 116 can also have "$x_{ref}$", "$y_{ref}$", "$x_{tar}$", and "$y_{tar}$" as known by the move information that is transmitted from the detecting unit 114. Because an unknown number in Equation 22 becomes one as "α", the image processing apparatus 100 can uniquely calculate "α" relating to the ratio of a time from the corrected pixel to the reference pixel of the input image B.

$$\alpha = \frac{\Delta T_{tar} + r(x_{tar}, y_{tar})}{\Delta T_{ref} - r(x_{ref}, y_{ref})}$$ Equation 22

The coordinates (x, y) of the corrected image corresponding to ($x_{ref}$, $y_{ref}$), ($x_{tar}$, $y_{tar}$) is expressed by Equation 21 described above, for example.

When the delay function r(x, y) is expressed by Equation 1, for example, "α" indicated by Equation 22 is expressed by Equation 19. That is, Equation 22 can be regarded as a generalized equation of Equation 19.

As described above, the image processing apparatus 100 that includes the move detecting unit 106 according to the second configuration example can calculate a reference ratio for each pixel, even when the delay time r(x, y) for each pixel is expressed by an arbitrary function.

A calculation method of the reference ratio when the delay time r(x, y) for each pixel is expressed by an arbitrary function is not limited to that described above. For example, as shown in FIG. 14, when the function that indicates a delay time changes for each certain section of the vertical coordinate, the image processing apparatus 100 that includes the move detecting unit 106 according to the second configuration example can be arranged to calculate the reference ratio for each section of the vertical coordinate expressed by the same function, in a similar manner to that of the case of including the move detecting unit 106 according to the first configuration example.

The re-detecting unit 116 calculates "α" relating to a time from the corrected pixel to the reference pixel of the input image B by performing the calculation as described above, and obtains a ratio of a time interval between the corrected frame and a frame corresponding to the input image A to a time interval between the corrected frame and a frame corresponding to the input image B, that is, the reference ratio. Then, the re-detecting unit 116 transmits the coordinates of the reference pixel and the reference ratio corresponding to each reference pixel to the correcting unit 108 as move information.

The move detecting unit 106 according to the second configuration example detects a move based on the input image (a frame image), and transmits the move information that indicates the detected move to the correcting unit 108, by the configuration shown in FIG. 18, for example. The move detecting unit 106 according to the second configuration example can be realized by an exclusive processing circuit having an arbitrary configuration capable of performing a move detection process as described above. However, a configuration of the move detecting unit 106 according to the second configuration example is not limited to that described above. For example, in the image processing apparatus 100, the control unit (not shown) can be arranged to play a role of the move detecting unit 106 according to the second configuration example, or the move detecting unit 106 according to the second configuration example can be a general-purpose processing circuit capable of also performing other process.

The move detecting unit 106 according to the present embodiment detects a move of a subject, and transmits move information that indicates the detected move to the correcting unit 108, by the configurations shown in FIG. 10 and FIG. 18, for example. A configuration of the move detecting unit 106 according to the present embodiment is not limited to those shown in FIG. 10 and FIG. 18. For example, the move detecting unit 106 according to the present embodiment can be arranged to adjust a calculated reference ratio, based on a user operation and the like. In the above case, the image processing apparatus 100 adjusts a time phase that is specified based on the delay time information.

An example of a configuration of the image processing apparatus 100 according to the present embodiment is explained below with reference to FIG. 6 again. The correcting unit 108 corrects the input image signal based on the input image signal, and the move information that is transmitted from the move detecting unit 106. More specifically, the correcting unit 108 obtains a corrected pixel from the input image signal, by using a reference ratio of a pixel calculated from a move detection by the move detecting unit 106 according to the first configuration example or from a move re-detection (a recalculation of the move vector) by the move detecting unit 106 according to the second configuration example, and by using a corresponding point (coordinates of the reference pixel) of the input image corresponding to each pixel of the corrected image. A process of the correcting unit 108 corresponds to a process of performing an interpolation.

Figure 22:
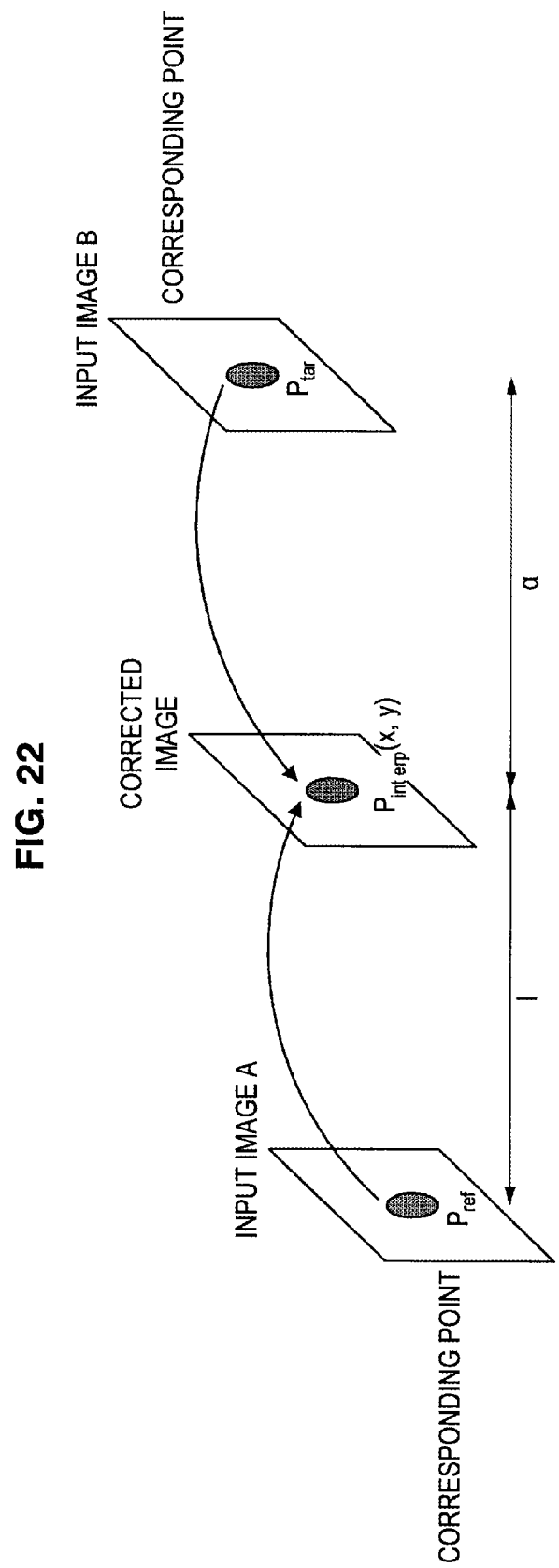
FIG. 22 is an explanatory diagram showing an example of a process by a correcting unit included in the image processing apparatus according to the present embodiment.

FIG. 22 is an explanatory diagram showing an example of a process by the correcting unit 108 included in the image processing apparatus 100 according to the present embodiment.

The correcting unit 108 determines a blend ratio of plural input pixels by using the reference ratio "1:α" of pixels, for example. For example, assume that a pixel value of a pixel (a corresponding point) of the input image A is "$P_{ref}$" and that a pixel value of a pixel (a corresponding point) of the input image B is "$P_{tar}$". Then, a pixel value "$P_{int\ erp}$" of the corrected pixel can be obtained by a linear interpolation by Equation 23 shown below, for example.

$$P_{interp}(x,\ y) = \frac{\alpha \times P_{ref} + P_{tar}}{\alpha + 1} \qquad \text{Equation 23}$$

The correcting unit 108 compensates for the move by correcting the input image signal by performing a calculation expressed by Equation 23 described above for each corresponding point. A process of the correcting unit 108 according to the present embodiment is not limited to that described above. For example, the correcting unit 108 can be arranged to determine the corrected pixel by using plural pairs of input images and plural results of detecting a move from these pairs, at the time of performing the move compensation.

Although the correcting unit 108 can be realized by an exclusive processing circuit that has an arbitrary configuration capable of performing the correction process as described above, for example, a configuration of the correcting unit 108 is not limited to that described above. For example, in the image processing apparatus 100, the control unit (not shown) can be arranged to play a role of the correcting unit 108, or the correcting unit 108 can be a general-purpose processing circuit capable of also performing other process.

Figure 23:
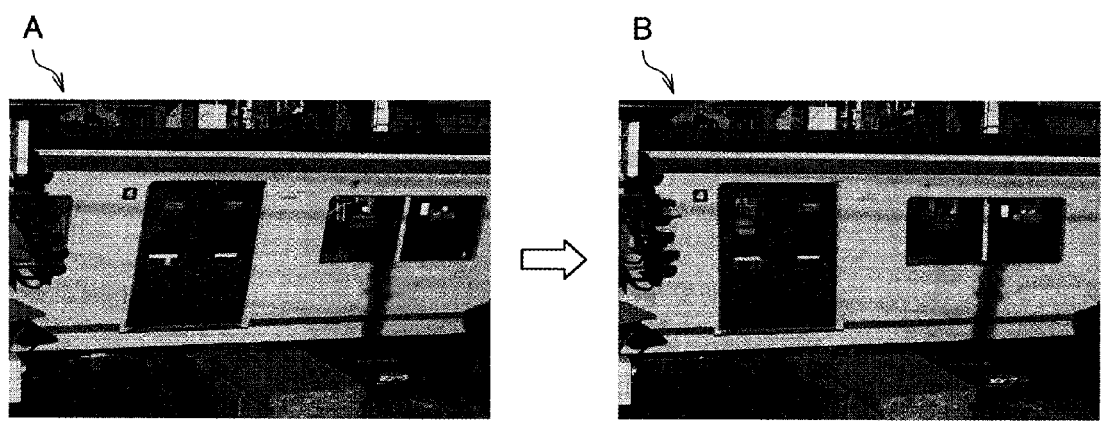
FIGS. 23A and 23B are explanatory diagrams showing an example of a result of a process by the image processing apparatus according to the present embodiment.

FIGS. 23A and 23B are explanatory diagrams showing an example of a result of a process by the image processing apparatus 100 according to the present embodiment. FIGS. 23A and 23B show a frame image that constitutes a moving image that is obtained when an image of a scene (a subject) is picked up by using an image pickup apparatus of the rolling shutter system. FIG. 23A shows an example of a processing result when a process according to the image processing method according to the present embodiment is not obtained. FIG. 23B shows an example of a processing result when the image processing apparatus 100 that includes the move detecting unit 106 according to the first configuration example shown in FIG. 10 performs a process (when a process according to the image processing method according to the present embodiment is used).

As shown in FIGS. 23A and 23B, it is clear that a focal plane distortion that occurs in the frame image shown in FIG. 23A is corrected in the frame image shown in FIG. 23B, by performing the process according to the image processing method according to the present embodiment.

The image processing apparatus 100 according to the present embodiment performs (A) a calculation process of a delay time in an image pickup based on an image pickup parameter, (B) a detection process of a move of the subject, and (C) a correction process (a move compensation process) of an image signal, by the configuration shown in FIG. 6, for example. Because the move is compensated for by taking account of a delay time of the image pickup by performing the process (A) to the process (C), the image processing method according to the present embodiment is realized. That is, the process (A) to the process (C) correspond to the process according to the image processing method according to the present embodiment. Accordingly, the image processing apparatus 100 can execute the image processing method according to the present embodiment by the configuration shown in FIG. 6, for example.

Therefore, the image processing apparatus 100 according to the present embodiment can correct a focal plane distortion by the configuration shown in FIG. 6, for example.

A configuration of the image processing apparatus 100 according to the present embodiment is not limited to the configuration shown in FIG. 6. For example, the image processing apparatus 100 according to the present embodiment can further include an image pickup unit (not shown) that picks up a moving image, in addition to the configuration shown in FIG. 6. In the case of the configuration described above, the image processing apparatus 100 can process an image signal that is generated by an image pickup performed by the image pickup unit (not shown), for example.

The image pickup unit (not shown) according to the present embodiment includes an image pickup device that is configured by a lens/an image pickup element and a signal processing circuit, for example. The lens/the image pickup element are configured by a lens of an optical system, and an image sensor that uses plural image pickup elements relating to the rolling shutter system such as a CMOS, for example. The image processing circuit includes an AGC (Automatic Gain Control) circuit and an ADC (Analog to Digital Converter), converts an analog signal generated by the image pickup element into a digital signal (image data), and performs various kinds of signal processing. A signal processing that is performed by the signal processing circuit includes a white balance correction process, a chrominance correction process, a gamma correction process, a YCbCr conversion process, an edge emphasis process, etc.

The image processing apparatus 100 can be arranged to further include a communicating unit (not shown), for example. By including the communicating unit (not shown), the image processing apparatus 100 can process an image signal (an input image signal) that is transmitted from an external apparatus, and transmit the processed image signal (an output image signal) to the external apparatus via the communicating unit (not shown), for example. Accordingly, when the image processing apparatus 100 further includes the communicating unit (not shown), an image processing system based on a connection to a network such as a cloud computing can be realized, for example.

The image processing apparatus 100 can be arranged to further include a mechanism that detects an image pickup environment that is valid for estimating an image pickup parameter (a third example of a process of acquiring an image pickup parameter) when the parameter acquiring unit 102 estimates an image pickup parameter, for example, and a mechanism that advises an optimum image-pickup environment to a person who picks up the image by shifting a mode. When the image processing apparatus 100 has a configuration described above, precision of the estimate can be further improved.

Further, as described above, it is not necessary for the image processing apparatus 100 according to the present embodiment to include the delay time calculating unit when the image processing apparatus 100 is configured to acquire the delay time information. In the case of the configuration described above, the image processing apparatus 100 realizes the image processing method according to the present embodiment, by the process (B) (a detection process of a move of a subject), and by the process (C) (a correction process (a move compensation process) of the image signal). That is, in the case of the configuration described above, the process (B) and the process (C) correspond to the process according to the image processing apparatus according to the present embodiment.

As described above, the image processing apparatus 100 according to the present embodiment calculates a delay time of an image pickup for each pixel, and detects a move of a subject contained in a moving image from plural frame images by taking account of the delay time, based on an image pickup parameter of the image pickup apparatus. The image processing apparatus 100 compensates for the detected move by correcting the image signal based on the corrected move. In this case, the image processing apparatus 100 corrects the image signal by taking account of the delay time of the image pickup. Therefore, the image processing apparatus 100 can compensate for a move, even when the move of the moving image is a move of a camera work or a move of the object (the subject), for example.

Therefore, the image processing apparatus 100 can be arranged to correct only a focal plane that has a possibility of occurrence in the moving image.

Further, the image processing apparatus 100 can obtain a reading-time phase for each pixel, and detects a move by taking account of the delay time of the image pickup and compensates for the move. Therefore, the image processing apparatus 100 can restore a pixel of the same time phase in the correction process.

The image processing apparatus 100 calculates a delay time of the image pickup based on the image pickup parameter. Therefore, the image processing apparatus 100 can perform a correction in high precision for each image pickup apparatus.

Further the image processing apparatus 100 can also adjust a calculated reference ratio. Therefore, the image processing apparatus 100 can generate an image of an arbitrary time phase, and can convert a frame rate together with the correction process, for example.

Although the image processing apparatus 100 is explained above as the present embodiment, the present embodiment is not limited to this embodiment. The present embodiment can be applied to various apparatuses that can process an image signal, such as an image pickup apparatus including a digital camera, a display apparatus including a computer such as a PC and a server and a television receiving apparatus, a communication apparatus including a portable telephone, a video/music reproducing apparatus (or a video/music recording/reproducing apparatus), and a game machine. The present embodiment can be also applied to an image processing IC (Integrated Circuit) that can be assembled in the apparatuses described above, for example.

A Program According to the Present Embodiment

A focal plane distortion can be corrected by a program that causes a computer to function as the image processing apparatus according to the present embodiment (a program that realizes the process according to the image processing method according to the present embodiment, such as a program that realizes the process (A) to the process (C) and a program that realizes the process (B) and the process (C), for example).

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, although it is described above that a program (a computer program) that causes a computer to function as the image processing apparatus according to the present embodiment is provided, the present embodiment can also provide recording mediums that respectively store the programs described above.

The aforementioned configurations are merely illustrative of this embodiment. Naturally, such configurations are within the technical scope of the present disclosure.

The present disclosure contains subject matter related to that disclosed in Japanese Priority Patent Application JP 2011-086498 filed in the Japan Patent Office on Apr. 8, 2011, the entire content of which is hereby incorporated by reference.

What is claimed is:

1. An image processing apparatus comprising:
   a move detecting unit that detects a movement of a subject contained in a moving image from a plurality of frame images, based on an image signal that indicates the moving image from the plurality of frame images, and delay time information that indicates a delay time of an image pickup;
   a correcting unit that corrects the image signal, based on the image signal and movement information that indicates the detected movement of the subject; and
   a delay time calculating unit that calculates the delay time information for each pixel, based on an image pickup parameter of an image pickup apparatus that has an image pickup element that sequentially picks up an image for each line of the moving image.

2. The image processing apparatus according to claim 1, wherein the correcting unit corrects the image signal, based on one or more pieces of move information.

3. The image processing apparatus according to claim 2, wherein the move information contains a reference ratio that indicates a ratio for referring to each of the plurality of frame images.

4. The image processing apparatus according to claim 1, further comprising:
   a parameter acquiring unit that acquires the image pickup parameter.

5. The image processing apparatus according to claim 4, wherein the parameter acquiring unit acquires identification information for identifying the image pickup apparatus from the image signal or from a recording medium that stores the identification information, and acquires the image pickup parameter corresponding to the acquired identification information, from a database to which the identification information and the image pickup parameter are related.

6. The image processing apparatus according to claim 4, wherein the parameter acquiring unit acquires the image pickup parameter by estimating the image pickup parameter, based on move information detected by the move detecting unit.

7. The image processing apparatus according to claim 4, wherein the parameter acquiring unit acquires the image pickup parameter from the image signal.

8. The image processing apparatus according to claim 1, further comprising
an image pickup unit that picks up the moving image.

9. An image processing apparatus comprising:
a move detecting unit that detects a movement of a subject contained in a moving image from a plurality of frame images, based on an image signal that indicates the moving image from the plurality of frame images, and delay time information that indicates a delay time of an image pickup, wherein the move detecting unit specifies a time phase when the moving image is picked up based on the delay time information, and detects the movement of the subject for each pixel based on the specified time phase; and
a correcting unit that corrects the image signal, based on the image signal and movement information that indicates the detected movement of the subject.

10. The image processing apparatus according to claim 9, wherein the move detecting unit adjusts the specified time phase based on the delay time information.

11. An image processing apparatus comprising:
a move detecting unit comprising:
a reference ratio calculating unit that calculates a reference ratio that indicates a ratio for referring to each of a plurality of frame images of a moving image, based on an image signal and delay time information, and
a detecting unit that detects a movement of a subject contained in the moving image from the plurality of frame images, based on the image signal and the calculated reference ratio; and
a correcting unit that corrects the image signal, based on the image signal and movement information that indicates the detected movement of the subject.

12. An image processing apparatus comprising:
a move detecting unit comprising:
a first detecting unit that detects a first movement of a subject contained in a moving image from a plurality of frame images, based on an image signal that indicates the moving image from the plurality of frame images, and
a second detecting unit that detects a second movement of the subject, based on first movement information that indicates the first movement detected by the first detecting unit, the image signal, and a delay time information; and
a correcting unit that corrects the image signal, based on the image signal and second movement information that indicates the detected second movement of the subject.

13. An image processing method comprising:
detecting a movement of a subject contained in a moving image from a plurality of frame images, based on an image signal that indicates the moving image from the plurality of frame images, and delay time information that indicates a delay time of an image pickup; and
correcting the image signal, based on the image signal and movement information that indicates the detected movement of the subject,
wherein the movement information comprises a reference ratio that indicates a ratio for referring to each of the plurality of frame images.

14. A non-transitory computer readable storage medium having stored thereon, a computer program, the computer program when executed by a computer causes the computer to perform steps comprising:
detecting a movement of a subject contained in a moving image from a plurality of frame images, based on an image signal that indicates the moving image from the plurality of frame images, and delay time information that indicates a delay time of an image pickup; and
correcting the image signal, based on the image signal and movement information that indicates the detected movement of the subject,
wherein the movement information comprises a reference ratio that indicates a ratio for referring to each of the plurality of frame images.

* * * * *